(12) United States Patent
Morimoto

(10) Patent No.: US 6,220,215 B1
(45) Date of Patent: Apr. 24, 2001

(54) COMBUSTION CHAMBER STRUCTURE IN AN INTERNAL COMBUSTION ENGINE

(75) Inventor: Kazuhiko Morimoto, Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 09/322,860

(22) Filed: May 28, 1999

(30) Foreign Application Priority Data

Jun. 3, 1998 (JP) .................................................. 10-170570

(51) Int. Cl.$^7$ ....................................................... F02R 23/10
(52) U.S. Cl. ........................................ 123/193.6; 123/661
(58) Field of Search ................................. 123/193.6, 661, 123/660, 639, 301, 302, 430, 432, 295

(56) References Cited

U.S. PATENT DOCUMENTS

| | | | |
|---|---|---|---|
| 4,177,769 | * 12/1979 | Okada et al. | 123/193.6 |
| 4,958,604 | * 9/1990 | Hashimoto | 123/661 |
| 5,115,774 | * 5/1992 | Nomura et al. | 123/661 |
| 5,127,379 | * 7/1992 | Kobayashi et al. | 123/661 |
| 5,320,075 | * 6/1994 | Regueiro | 123/193.6 |
| 5,819,700 | * 10/1998 | Ueda et al. | 123/661 |

FOREIGN PATENT DOCUMENTS

| | | |
|---|---|---|
| 58-57528 | 4/1983 | (JP) . |
| 59-22958 | 2/1984 | (JP) . |
| 3-6827 | 5/1987 | (JP) . |
| 2-56816 | 4/1990 | (JP) . |
| 5-21132 | 3/1993 | (JP) . |
| 6-12724 | 2/1994 | (JP) . |
| 7-166872 | 6/1995 | (JP) . |
| 8-246877 | 9/1996 | (JP) . |
| 9-105330 | 4/1997 | (JP) . |
| 10-8968 | 1/1998 | (JP) . |

\* cited by examiner

*Primary Examiner*—Marguerite McMahon
(74) *Attorney, Agent, or Firm*—Flynn, Thiel, Boutell & Tanis, P.C.

(57) ABSTRACT

In an internal combustion engine a spark plug is disposed at a nearly central position of a combustion chamber formed between the underside of a cylinder head and a crown of a piston. Intake valves are disposed on one side of the cylinder head, while exhaust valves are disposed on the other side of the cylinder head. A recess having a generally rectangular bottom is formed in the piston crown and extends in a slap direction connecting the intake and exhaust valves. The recess has vertical wall portions for the formation of squish flows at both ends thereof in the slap direction. The vertical wall portions are contiguous to the piston crown and connect both ends of the recess smoothly with the piston crown. Thus, the piston realizes a stratified charge without obstructing reverse tumbling flows. The symmetric shape of the piston in a slap direction maintains the piston in good weight balance, and thereby eliminates mechanical loss, such as oscillation.

19 Claims, 23 Drawing Sheets

INTAKE-SIDE    EXHAUST-SIDE

COMBUSTION CHAMBER STRUCTURE IN AN INTERNAL COMBUSTION ENGINE

FIELD OF THE INVENTION

The present invention relates to a combustion chamber structure in an internal combustion engine. More particularly, the invention is concerned with a combustion chamber structure in an internal combustion engine having an improved shape for a piston crown, capable of realizing a stratified charge without obstructing reverse tumbling flows. The piston crown also has a symmetric shape in a slap direction to improve the weight balance.

BACKGROUND OF THE INVENTION

In conventional direct injection type internal combustion engines, for realizing a stratified charge, a ball-like depression or a horseshoe-shaped enclosure generally is formed at the crown of a piston to trap fuel.

An example of a combustion chamber structure in the above conventional type of an internal combustion engine is disclosed in Japanese Patent Laid-Open No. 7-166872. In a four-valve type internal combustion engine disclosed in this publication, two intake ports each provided with an intake valve and two exhaust ports each provided with an exhaust valve are formed in positions substantially opposed to each other for a combustion chamber with a spark plug provided nearly centrally. Both intake ports are constituted as tumbling ports for imparting vertical tumbling flows to intake air which is introduced into a cylinder from the intake ports. Further, a slot is formed in a portion of the crown of a piston adapted to reciprocate within the cylinder which portion is positioned under the spark plug. The slot is formed so as to extend from a lower position between both exhaust valves toward a lower position between both intake valves, with one or more protuberances being formed on both right and left sides of the slot of the piston crown so as to extend from the exhaust valve side toward the intake valve side in an inwardly inclined manner in plan, to make the air-fuel ratio of introduced air-fuel mixture lean, thereby attaining low fuel consumption and low pollution.

Another example of a combustion chamber structure in such conventional type of an internal combustion engine is disclosed in Japanese Patent Laid-Open No. 8-246877. In the combustion chamber structure disclosed therein, a combustion chamber is defined between a recess formed in the underside of a cylinder head and a piston. A spark plug is disposed nearly centrally of a cylinder and one or plural intake valves are disposed at a position offset to one side of the cylinder. An intake port or ports are formed so that a tumbling flow is formed within the combustion chamber by an intake flow which enters the combustion chamber through the intake valve or valves. Further, a recess is formed radially in the piston crown so as to be narrower on the intake valve side and wider on the opposite side, thereby realizing a stratified charge of a rich air-fuel mixture in the vicinity of the spark plug positioned centrally of the cylinder.

A further conventional example is disclosed in Japanese Patent Laid-Open No. 9-105330. In a four-valve type internal combustion engine disclosed in this publication, two intake ports each provided with an intake valve and two exhaust ports each provided with an exhaust valve are disposed at positions substantially opposed to each other for a combustion chamber with a spark plug provided nearly centrally. Both intake ports are constituted as tumbling ports for imparting vertical tumbling flows to intake air which is introduced into a cylinder from the intake ports. Further, a first recess is formed in the crown of a piston in the cylinder at a position approximately just under both exhaust valves, the first recess being formed wide so as to serve also as a valve recess for both exhaust valves, while a second recess narrower and shallower than the first recess is formed in the crown of the piston at a position between and approximately just under both intake valves, the second recess being formed so as to communicate with the first recess, to prevent deceleration of both tumbling flows and enhancing the influence of both tumbling flows on the vicinity of the spark plug, thereby making the air-fuel ratio leaner.

A still further conventional example is disclosed in Japanese Patent Laid-Open No. 10-8968. A piston for an internal combustion engine disclosed in this publication includes two ridge portions each having an edge line extending in parallel with a crank axis. The ridge portions are formed on the piston crown in a sandwiching relation to a central part of the crown, and a recess constituted by a cylindrical surface having an axis parallel to the crank axis is formed between the ridge portions.

A still further conventional example is disclosed in Japanese Utility Model Publication No. 3-6827. According to this publication, a combustion chamber structure in an engine is formed in a pent roof shape whose section in a direction orthogonal to the direction of a cylinder row is generally triangular, while on a piston crown located at a lower position of the combustion chamber, and constituting part of the same chamber, there are formed squish zones at both side positions in conformity with the pent roof shape. The squish zones extend in the cylinder row direction, and with a recess formed between the squish zones. The recess extends up to piston ends in the cylinder row direction and is formed in an elliptic shape which is curved so that the outer periphery of the recess expands toward the exterior of the piston. The bottom of the recess has a spherical shape which gradually deepens toward the inner periphery from the outer periphery of the ellipse. Further, a spark plug is disposed nearly centrally of the recess to decrease the amount of hydrocarbon discharged.

A still further conventional example is disclosed in Japanese Utility Model Laid-Open No. 58-57528. A combustion chamber in a direct injection type internal combustion engine is disclosed in this publication. An edge portion of a piston cavity is projected toward a cylinder head to form a weir portion for minimizing the gap between it and the cylinder head when the piston reaches its top dead center.

A still further conventional example is disclosed in Japanese Utility Model Laid-Open No. 59-22958. A piston in an internal combustion engine, disclosed in this publication, has a ring-like protuberance and is formed on a piston crown.

A still further conventional example is disclosed in Japanese Utility Model Laid-Open No. 2-56816. According to a combustion chamber structure in an internal combustion engine disclosed in this publication, a spark plug is disposed nearly centrally of an upper wall of a cylinder head, the upper wall defining a combustion chamber and being formed in a pent roof shape. Three intake valves are disposed on one side of the upper wall. Of the three intake valves, the one located at the center is larger in diameter than the other intake valves located on both sides, and in a piston crown portion to which the central intake port faces, there is formed a curved recess extending in the axial direction of the same port.

A still further conventional example is disclosed in Japanese Utility Model Laid-Open No. 5-21132. According to a combustion chamber in an internal combustion engine disclosed in this publication, there is a cylinder head wherein intake valves and exhaust valves are arranged in a generally symmetric shape. A recess having a deep portion on the exhaust valve side is formed in a piston crown to increase the amount of an air-fuel mixture which reverse tumbles under the exhaust valves, thereby improving the state of combustion.

A still further conventional example is disclosed in Japanese Utility Model Laid-Open No. 6-12724. According to a combustion chamber structure in an internal combustion engine disclosed in this publication, a depression-like cavity is formed in a piston crown and two spark plugs are disposed in a cylinder head in such a manner that the respective tips face the interior of the cavity in a radially spaced relation to each other on one side in the cylinder. The cavity is formed in a sectorial shape in plan so as to be narrow toward the center of the piston in an area spaced radially away from the two spark plugs and wider toward the peripheral edge portion of the piston in an opposite area. This shape of the cavity is effective in increasing the burning speed in the area where the flame propagation distance is long.

In the conventional internal combustion engines, as shown in FIGS. 54 and 55, two layers of tumbling flows are created within a combustion chamber 218 of an internal combustion engine 202 when intake air is fed into the combustion chamber 218 form intake ports 214-1 and 214-2 through two intake valves 222-1 and 222-2. In this case, if a crown 208a of a piston 208 is formed flat as in FIGS. 54 and 55, there arises an inconvenience in that trapping of fuel is not carried out effectively.

In an effort to eliminate such inconvenience it has been proposed to form a ball-like depression or a horseshoe-shaped enclosure at the piston crown to trap fuel by the depression or the enclosure and realize a stratified charge.

In an internal combustion engine having a large bore diameter, a ball-like depression or a horseshoe-shaped enclosure is formed so as to effect trapping of fuel relatively easily. But in an internal combustion engine having a small bore diameter, say, 80 mm or less, it is difficult to retain an air layer around an air-fuel mixture present at a central part and thus difficult to realize a stratified charge. It has been desired to remedy this point.

Additionally, in the case where a ball-like depression or a horseshoe-shaped enclosure is formed at the piston crown of the internal combustion engine, the weight balance of the piston is lost and causes a mechanical loss such as an increase of piston side thrust.

SUMMARY OF THE INVENTION

In order to eliminate the above-mentioned inconveniences, in an internal combustion engine wherein a spark plug is disposed at a nearly central position of a combustion chamber formed between the underside of a cylinder head and a crown of a piston, and intake valves are disposed on one side of the cylinder head, while exhaust valves are disposed on the other side of the cylinder head, a recess extends in a slap direction connecting the intake and exhaust valves and having a generally rectangular bottom formed in the piston crown. The recess is formed so as to leave vertical wall portions for the formation of squish flows at both ends of the recess in the slap direction. The vertical wall portions are contiguous to the piston crown so as to connect both ends of the recess smoothly with the piston crown.

According to the present invention constructed as above, a stratified charge is realized by the recess formed in the piston crown, without obstructing reverse tumbling flows, and the shape of the piston in the slap direction is made symmetric to improve the weight balance of the piston, thereby positively preventing the occurrence of a mechanical loss.

DETAILED DESCRIPTION OF THE INVENTION

Figure 3:
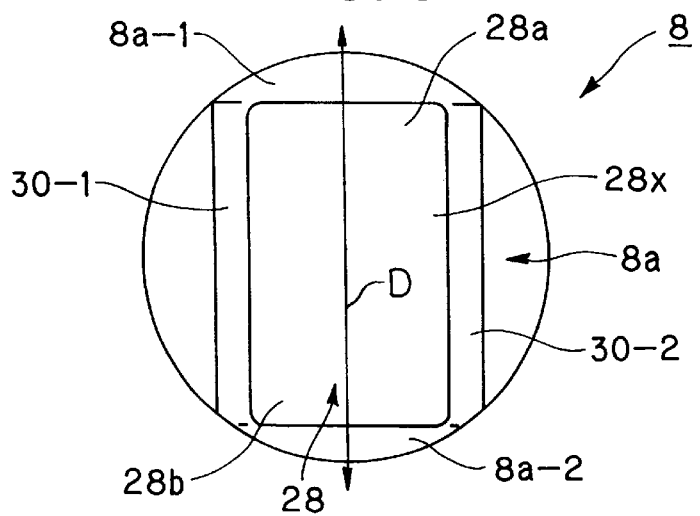
FIG. 3 is a plan view of the piston.
Figure 4:
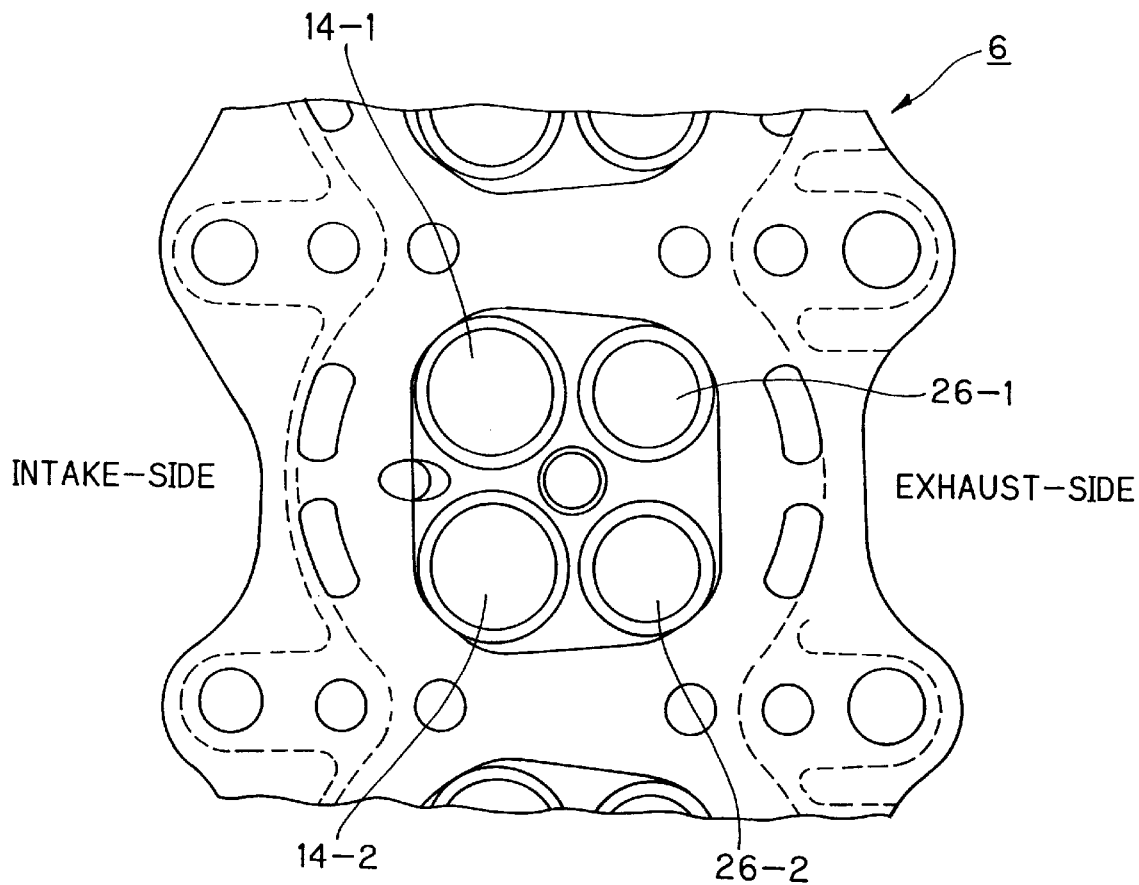
FIG. 4 is a bottom view of a cylinder head.
Figure 5:
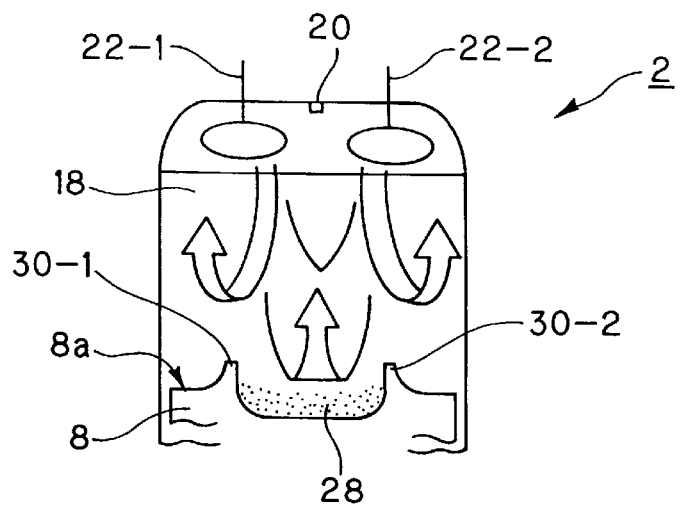
FIG. 5 is a schematic diagram of an intake side of an internal combustion engine as seen from an exhaust side.
Figure 6:
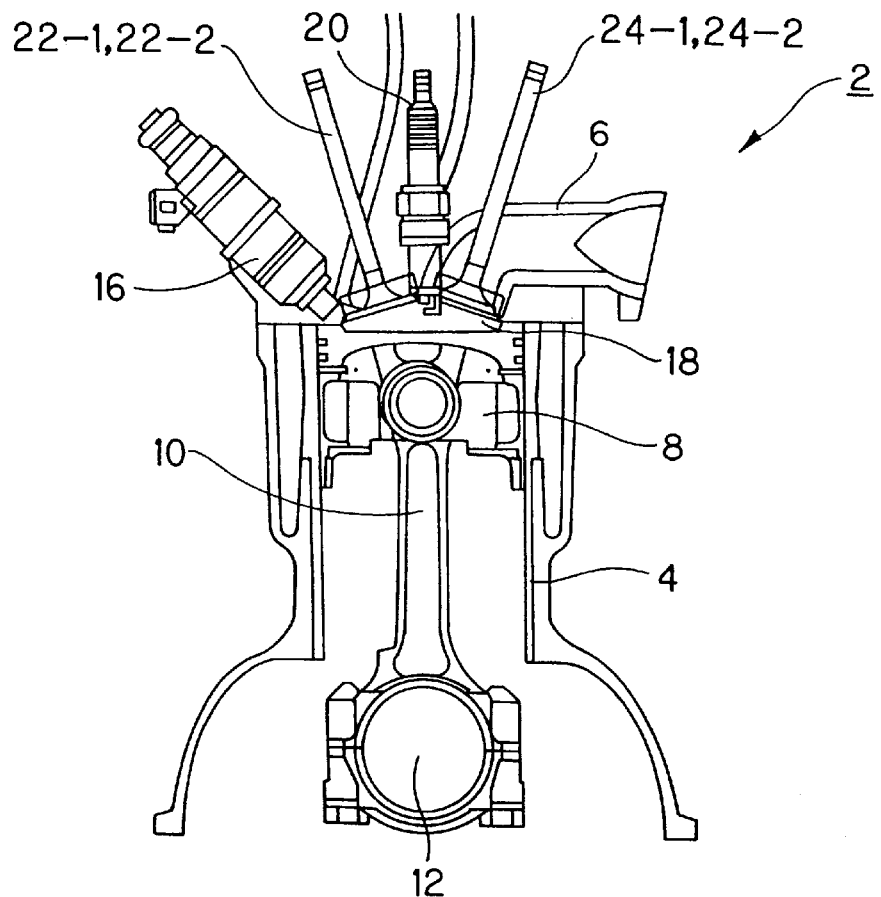
FIG. 6 is a schematic front view of the internal combustion engine at an initial stage of the suction stroke.

FIGS. 1 to 19 illustrate the first embodiment of the present invention. In FIG. 6, the numeral 2 denotes an internal combustion engine, numeral 4 denotes a cylinder block, and numeral 6 denotes a cylinder head. The internal combustion engine 2 has the cylinder head 6 mounted on top of the cylinder block 4. A piston 8 adapted to reciprocate is disposed within the cylinder block 4 and is connected to a crank shaft 12 through a connecting rod 10. In the cylinder head 6 of the internal combustion engine 2, as shown in FIG. 4, for example, two intake ports 14-1 and 14-2 are formed for creating reverse tumbling flows and an injector 16 is disposed on the intake ports side of the cylinder head. A combustion chamber 18 is formed between the underside of the cylinder head 6 and a crown 8a of the piston 8, and a spark plug 20 is disposed nearly centrally of the combustion chamber 18. Two intake valves 22-1 and 22-2 are disposed on one side of the cylinder head 6, while two exhaust valves 24-1 and 24-2 are disposed on the opposite side. Numerals 26-1 and 26-2 denote exhaust ports.

Figure 1:
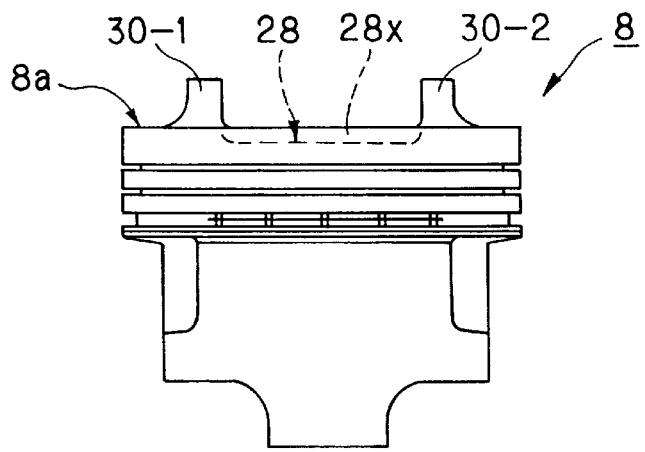
FIG. 1 is a front view of a piston according to the first embodiment of the present invention.
Figure 2:
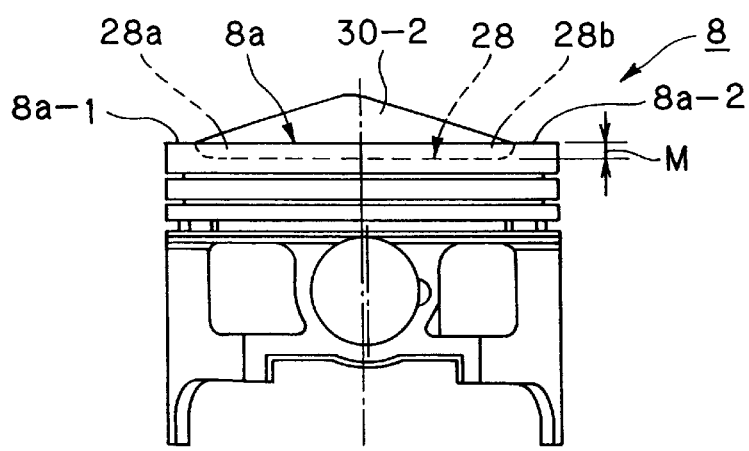
FIG. 2 is a right side view of the piston.

In the crown 8a of the piston 8 a recess 28 is formed having a generally rectangular bottom 28X. The recess 28 extends in a slap direction defined as the direction of central axis D in FIG. 3 and connects an intermediate position between the intake valves 22-1 and 22-2 and an intermediate position between the exhaust valves 24-1 and 24-2. The recess 28 is formed so that the crown 8a of the piston 8 is allowed to remain at both ends of the recess 28 in the slap direction, that is, at both intake-side end portion 28a and exhaust-side end portion 28b, for the creation of squish flows, and so that both ends 28a and 28b of the recess 28 and the crown 8a of the piston 8 are smoothly contiguous to each other. To be more specific, as shown in FIGS. 1 to 3, the recess 28 extends in the slap direction from bore wall side ends of the intake ports 14-1 and 14-2 up to bore wall side ends of the exhaust ports 26-1 and 26-2 and thus has a generally rectangular bottom 28x and a predetermined depth M.

On the crown 8a of the piston 8 there is formed an intake-side residual crown portion (also referred to as "intake-side squish") 8a-1 between the intake-side end portion 28a of the recess 28 and the outer periphery of the piston 8. An exhaust-side residual crown portion (also referred to as "exhaust-side squish") 8a-2 is also formed between the exhaust-side end portion 28b of the recess 28 and the outer periphery of the piston 8. The intake-side end portion 28a of the recess 28 and the intake-side residual crown portion 8a-1 of the piston 8 are smoothly connected together and so are the exhaust-side end portion 28b and the exhaust-side residual crown portion 8a-2, as shown in FIG. 2.

Further, flow dividing ribs 30-1 and 30-2 projecting toward the cylinder head 6 are formed in the extending direction of the recess 28 formed in the crown 8a of the piston 8 and on both sides of the recess 28. The flow dividing ribs 30-1 and 30-2 are projected in a generally triangular shape to match the shape of the combustion chamber defined by the underside of the cylinder head 6, namely, the concave shape of the cylinder head 6 underside. It is assumed that the internal combustion engine 2 in this first embodiment is of a compression stroke injection type wherein the injection of fuel is performed at a later stage of the compression stroke.

The operation of this embodiment is described as follows. As shown in FIG. 5, when intake air is fed from the intake ports 14-1 and 14-2 in the internal combustion engine 2 into the combustion chamber 18, two flows from both intake ports 14-1 and 14-2 are divided by the two flow dividing ribs 30-1 and 30-2 and three reverse tumbling flows are created. The flow which has arrived at the intake-side end portion 28a of the recess 28 flows through the recess 28 up to the exhaust-side end portion 28b and grows into a single reverse tumbling flow. At this time, between the flow in the recess 28 and both-side flows there arises a difference in speed which depends on the depth of the recess 28, thus ensuring separation of the flows. In this way, three vertical sandwich-like charge layers are formed within the combustion chamber 18 of the internal combustion engine 2.

Figure 7:
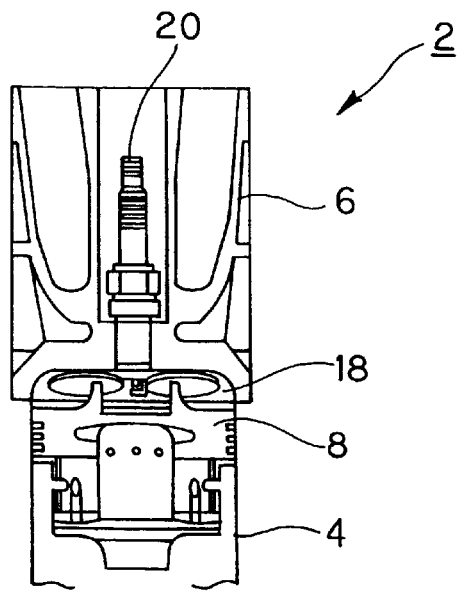
FIG. 7 is a schematic right side view thereof.
Figure 8:
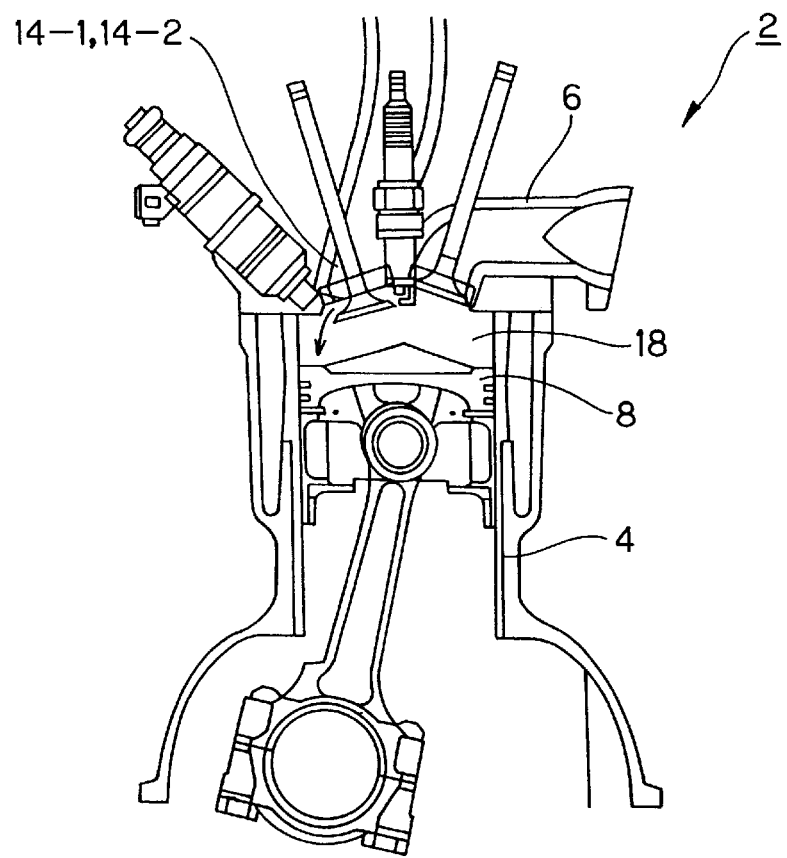
FIG. 8 is a schematic front view of the internal combustion engine at a middle stage of the suction stroke.
Figure 9:
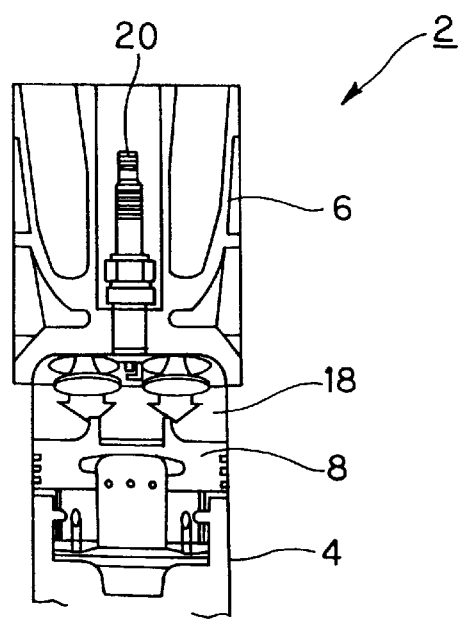
FIG. 9 is a schematic right side view thereof.
Figure 10:
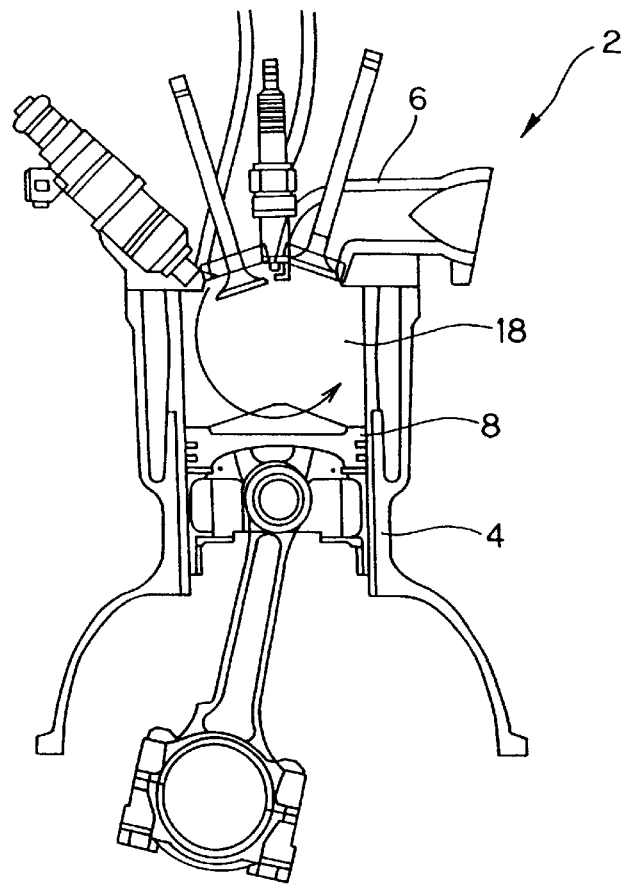
FIG. 10 is a schematic front view of the internal combustion engine at a later stage of the suction stroke.
Figure 11:
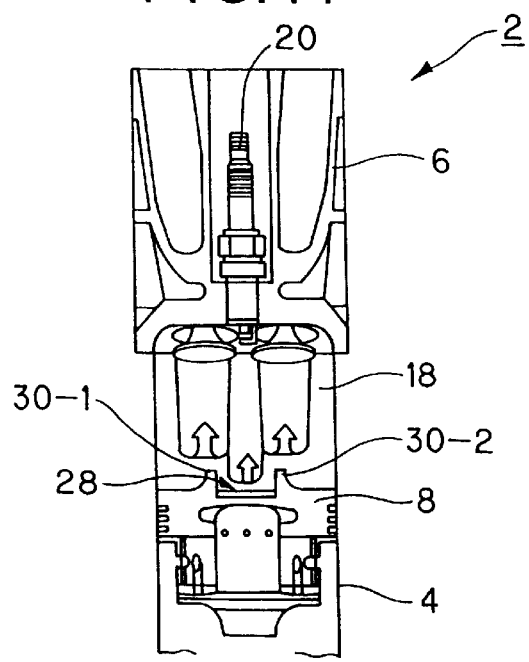
FIG. 11 is a schematic right side view thereof.
Figure 12:
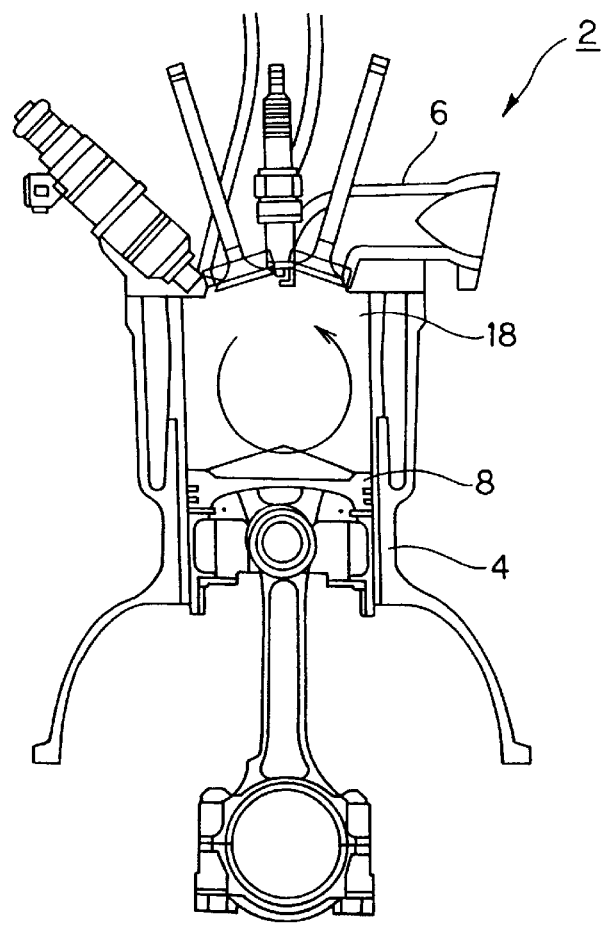
FIG. 12 is a schematic front view of the internal combustion engine at the end of the suction stroke.
Figure 13:
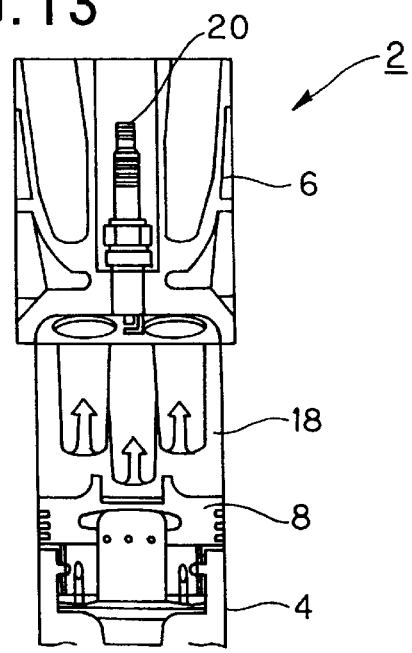
FIG. 13 is a schematic right side view thereof.
Figure 14:
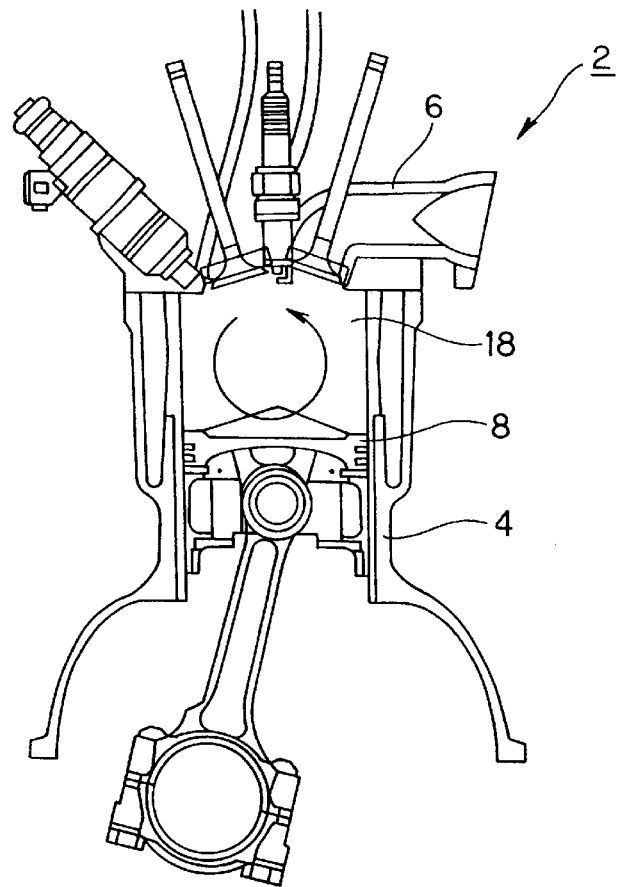
FIG. 14 is a schematic front view of the internal combustion engine at an initial stage of the compression stroke.
Figure 15:
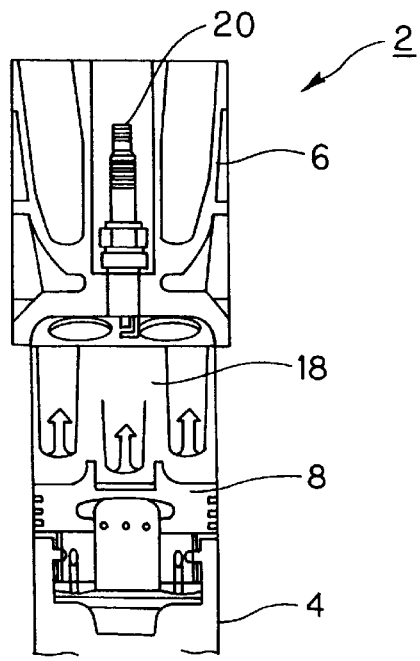
FIG. 15 is a schematic right side view thereof.
Figure 16:
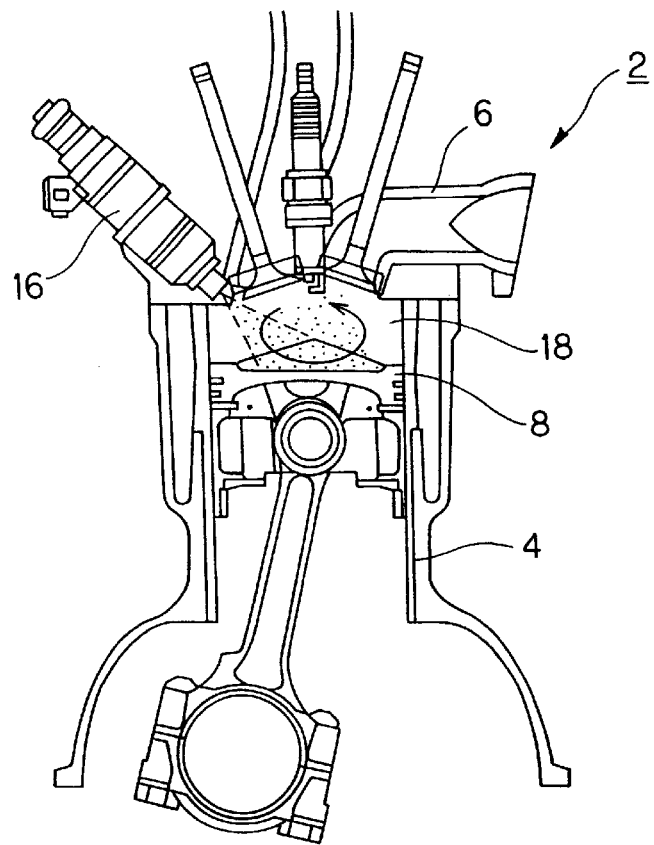
FIG. 16 is a schematic front view of the internal combustion engine at a later stage of the compression stroke and in a state of fuel injection.
Figure 17:
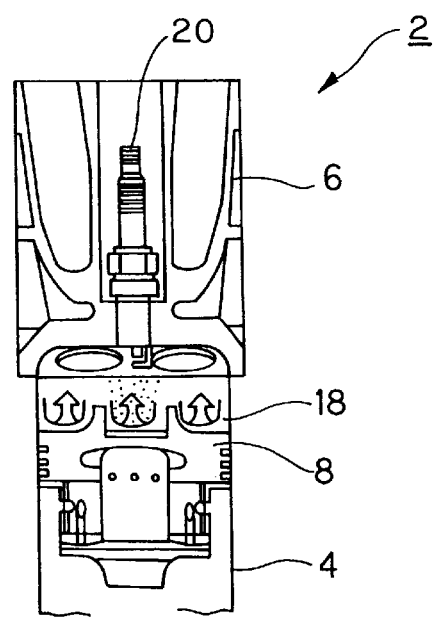
FIG. 17 is a schematic right side view thereof.
Figure 18:
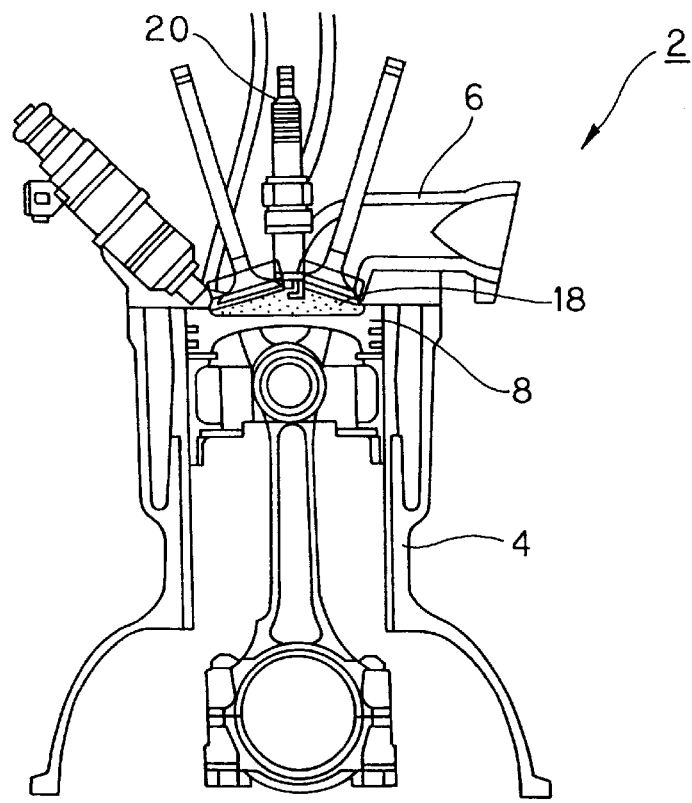
FIG. 18 is a schematic front view of the internal combustion engine at the end of the compression stroke and in a state of ignition.
Figure 19:
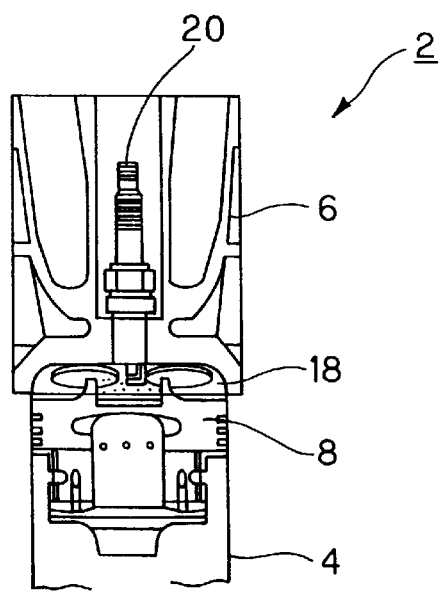
FIG. 19 is a schematic right side view thereof.

A description will now be given of the internal combustion engine 2 of the compression stroke injection type. As shown in FIGS. 6 and 7, the suction stroke is started from a top dead center position of the piston 8. Then, as shown in FIGS. 8 and 9, the piston 8 goes down with rotation of the crank shaft 12 and intake air is fed into the combustion chamber 18 from the intake ports 14-1 and 14-2. As the piston 8 goes down, as shown in FIGS. 10 and 11, the interior of the combustion chamber 18 expands and reverse tumbling flows begin to be formed in the intake air which enters the combustion chamber 18 from the intake ports 14-1 and 14-2. At this time, the intake air flowing into the combustion chamber 18 is divided into three flows by the recess 28 and the flow dividing ribs 30-1, 30-2, as shown in FIG. 11. When the piston 8 has moved down to its bottom dead center and the suction stroke is over, there are formed three divided reverse tumbling flows, or stratified charge flows, within the combustion chamber 18, as shown in FIGS. 12 and 13. Upon shift from the suction stroke to the compression stroke, the piston 8 begins to go up, as shown in FIGS. 14 and 15. Before arrival of the piston 8 at its top dead center, that is, at a later stage of the compression stroke, fuel is injected directly from the injector 16 toward the reverse tumbling flow positioned centrally in the combustion chamber 18, as shown in FIGS. 16 and 17. After the injection of fuel and upon completion of the compression stroke with the piston having arrived at its top dead center, ignition is performed by the spark plug 20 disposed nearly centrally of the combustion chamber 18, as shown in FIGS. 18 and 19. After the ignition, a shift is made to the combustion stroke. In this way, without obstructing the reverse tumbling flows, a stratified charge can be realized by the recess 28 formed in the crown 8a of the piston 8. This is advantageous in practical use.

Since the shape of the piston 8 in the slap direction is symmetric, the piston is kept in good weight balance, so there is little influence on the piston behavior and it is possible to eliminate a mechanical loss such as oscillation, and to improve the engine output. Moreover, since two flow dividing ribs 30-1 and 30-2 projecting toward the cylinder head 6 are formed on both sides of the recess 28 on the crown 8a of the piston 8, the stratification of the reverse tumbling flows can be promoted by the flow dividing function of the ribs. This enables diminishing of the difference in height between the recess 28 and the crown 8a of the piston 8 and also allows the piston 8 to be formed compactly. Further, since the flow dividing ribs 30-1 and 30-2 are projected to match the shape of the combustion chamber which is defined by the underside of the cylinder head 6, that is, to match the concave shape of the cylinder head 6 underside, a stratified charge can be realized by the flow dividing ribs 30-1 and 30-2. Thus, lean burn can be stabilized.

Figure 20:
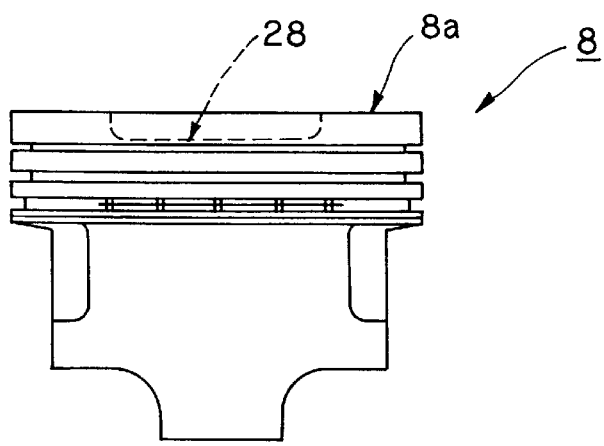
FIG. 20 is a front view of a piston according to a second embodiment of the present invention.
Figure 21:
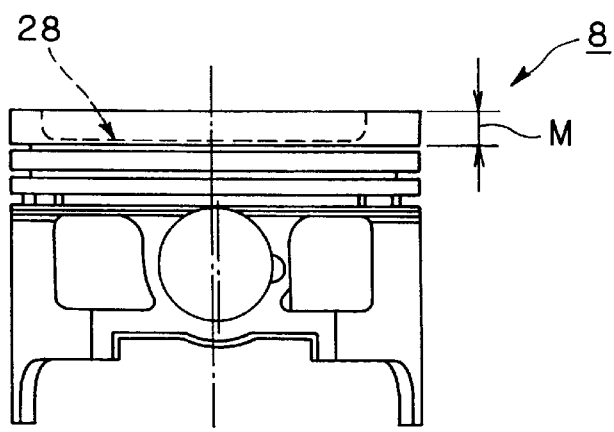
FIG. 21 is a right side view of the piston.
Figure 22:
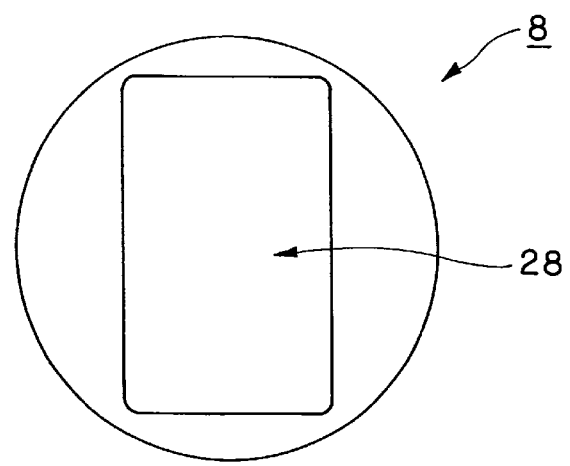
FIG. 22 is a plan view of the piston.

Referring now to FIGS. 20 to 22, there is illustrated a combustion chamber structure according to the second embodiment of the present invention. In this second embodiment, the portions which fulfil the same functions as in the first embodiment will be identified by like reference numerals.

In the previous first embodiment, the two flow dividing ribs 30-1 and 30-2 projecting toward the cylinder head 6 are formed on both sides of the recess 28 on the crown 8a of the piston 8. The second embodiment is characterized by dispensing with the two flow dividing ribs. More specifically, as shown in FIGS. 20 to 22, a recess 28 of a predetermined depth M is formed in the crown 8a of the piston 8. At this time, two flow dividing ribs as above are not formed. According to this structure, with the recess 28 formed in the crown 8a of the piston 8, a stratified charge can be realized without obstructing reverse tumbling flows as in the previous first embodiment. Since the shape of the piston 8 in the slap direction is symmetric, the piston is kept in good weight balance, so there is little influence on the piston behavior. Thus, it is possible to eliminate a mechanical loss such as oscillation and hence possible to improve the engine output, as is the case with the previous first embodiment.

Further, even without forming two flow dividing ribs on both sides of the recess 28 on the crown 8a of the piston 8, a flow dividing function can be expected because of a difference in height between the crown 8a of the piston 8 and the recess 28. Thus, not only reverse tumbling flows can be stratified but also the difference in height between the recess 28 and the crown 8a of the piston 8 can be diminished. This contributes to the reduction in size of the piston 8.

Figure 23:
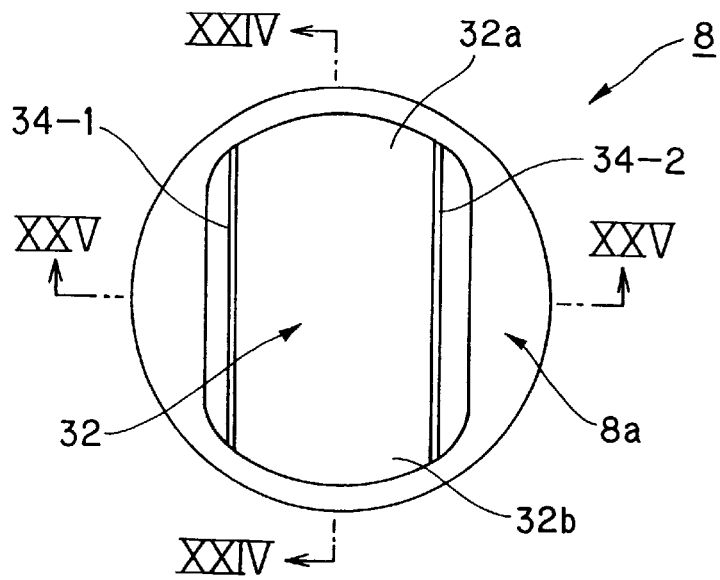
FIG. 23 is a plan view of a piston according to a third embodiment of the present invention.
Figure 24:
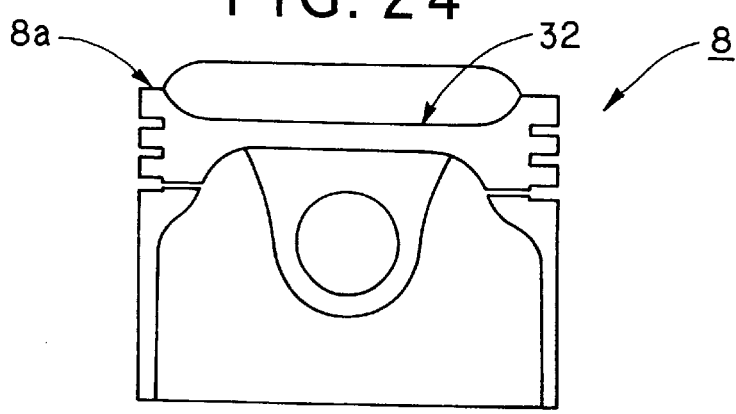
FIG. 24 is a sectional view taken on line XXIV—XXIV in FIG. 23.
Figure 25:
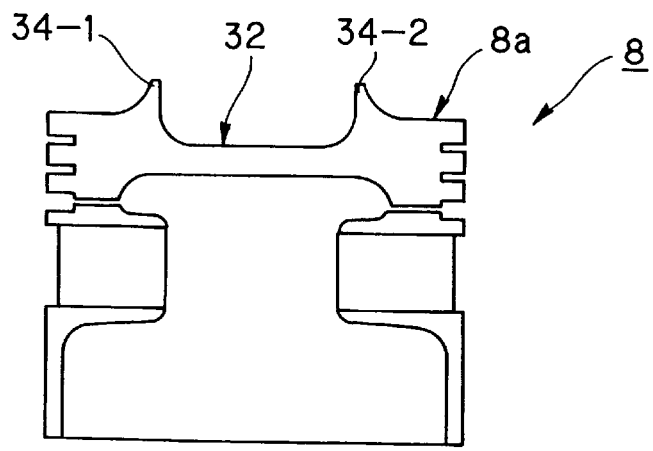
FIG. 25 is a sectional view taken on line XXV—XXV in FIG. 23.

Referring now to FIGS. 23 to 25, there is illustrated a combustion chamber structure according to the third embodiment of the present invention.

Although in the first embodiment the bottom 28x of the recess 28 is formed in a generally rectangular shape at the time of forming the recess 28 in the crown 8a of the piston 8, this third embodiment is characterized in that an intake-side end portion 32a and an exhaust-side end portion 32b of a recess 32 are each formed in an arcuate shape. More specifically, as shown in FIG. 23, the intake-side and exhaust-side end portions 32a, 32b of the recess 32 are formed in an arcuate shape conforming to the outer peripheral shape of the piston 8. Two flow dividing ribs 34-1 and 34-2 are formed on both sides of the recess 32 on the piston crown 8a so as to project to about the same height except the portions thereof located near the intake-side and exhaust-side end portions 32a, 32b of the recess 32. At the same time, outer side faces of both flow dividing ribs 34-1 and 34-2 are formed as gentle inclined faces.

According to this structure, with the recess 32 formed in the crown 8a of the piston 8, a stratified charge can be realized without obstructing reverse tumbling flows as is the case with the first and second embodiments. Because the shape of the piston 8 in the slap direction is symmetric, the piston is kept in good weight balance. Therefore, as in the first and second embodiments, there is little influence on the piston behavior and mechanical loss such as oscillation is eliminated and engine output is improved.

Moreover, since the two flow dividing ribs 34-1 and 34-2 are formed on both sides of the recess 32 on the crown 8a of the piston 8 so as to project toward the cylinder head 6, the stratification of reverse tumbling flows can be promoted by the flow dividing function of the flow dividing ribs 34-1 and 34-2 as in the first embodiment. Thus, it is possible to diminish the difference in height between the recess 32 and the crown 8a of the piston 8 and hence possible to make the piston 8 compact. Further, since the recess 32 is formed in an arcuate shape matching the outer peripheral shape of the piston 8, the flow of intake air into and out of the recess 32 becomes smooth, thus contributing to the formation of stable reverse tumbling flows.

Since the flowing dividing ribs 34-1 and 34-2 are projected to about the same height except the portions thereof located near the intake-side and exhaust-side end portions 32a, 32b of the recess 32, not only is it possible to reduce the size of the piston 8, but also the formation of the flow dividing ribs 34-1 and 34-2 becomes easier.

Referring now to FIGS. 26 to 39, there is illustrated a combustion chamber structure according to the fourth embodiment of the present invention. Although the internal combustion engine 2 in the first embodiment is of the compression stroke injection type wherein the injection of fuel is performed at a later stage of the compression stroke, this fourth embodiment is characterized by using an internal combustion engine 2 of a suction stroke injection type wherein the injection of fuel is conducted at an early stage of the suction stroke. More specifically, the recess 28 formed in the crown 8a of the piston 8 and the two flow dividing ribs 30-1, 30-2, which are used in the first embodiment, are used as they are and only the injection method in the internal combustion engine 2 is changed.

Figure 26:
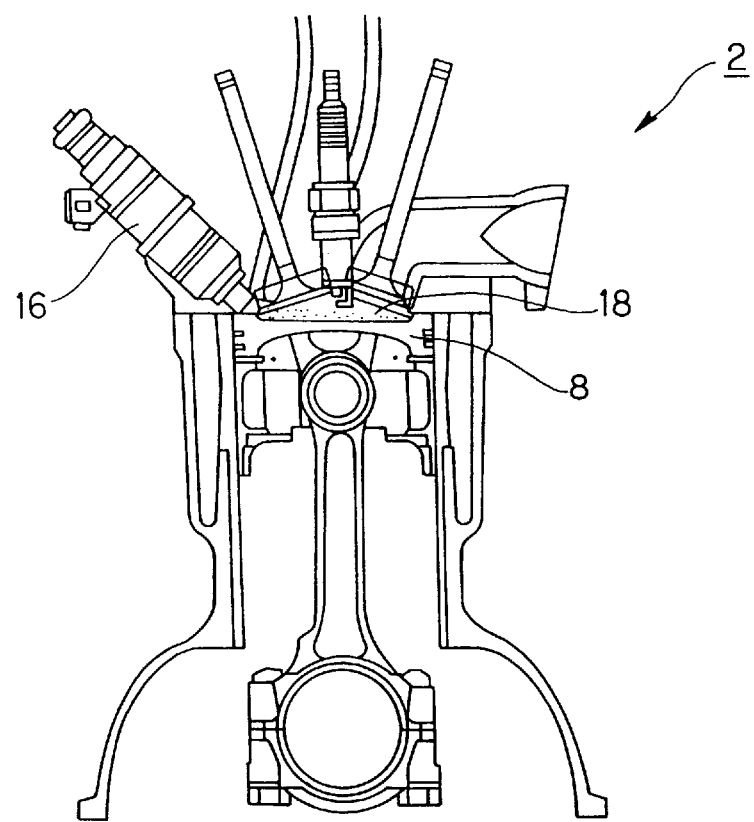
FIG. 26 is a schematic front view of an internal combustion engine at an initial stage of the suction stroke and in a state of fuel injection according to a fourth embodiment of the present invention.
Figure 27:
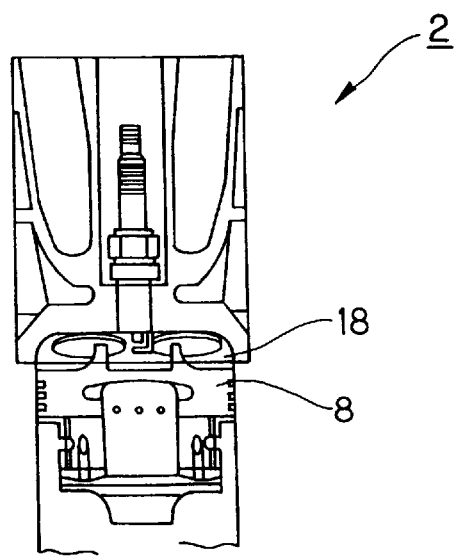
FIG. 27 is a schematic right side view thereof.
Figure 28:
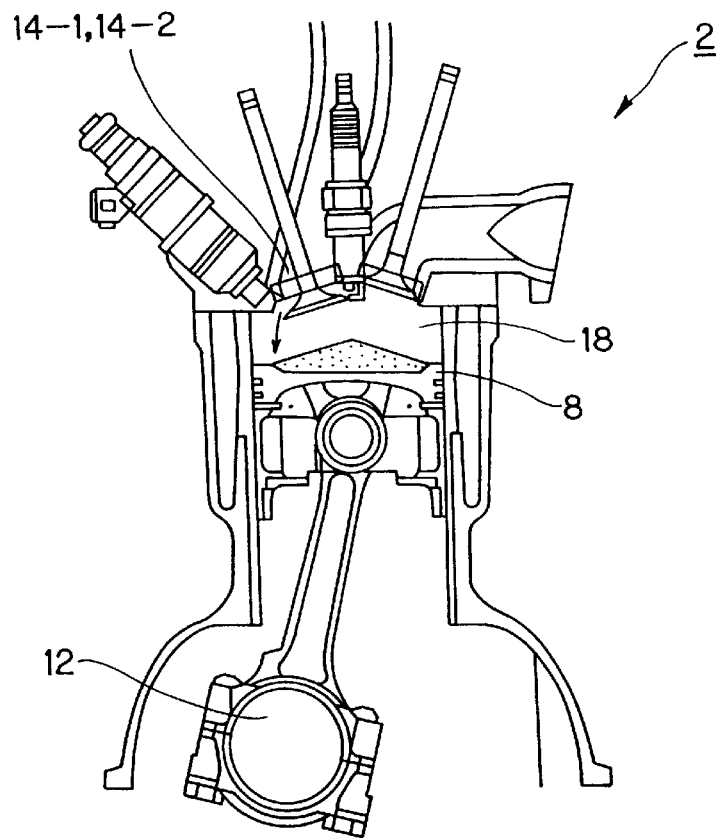
FIG. 28 is a schematic front view of the internal combustion engine at a middle stage of the suction stroke.
Figure 29:
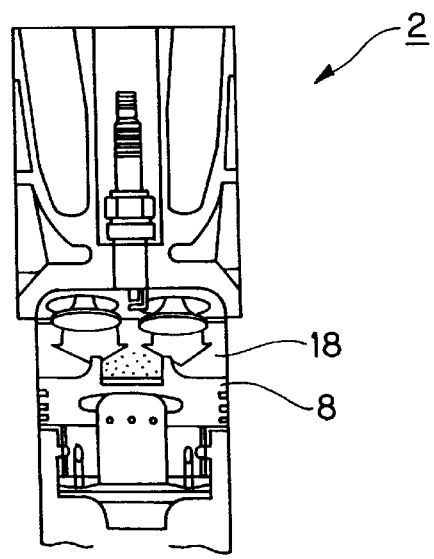
FIG. 29 is a schematic right side view thereof.
Figure 30:
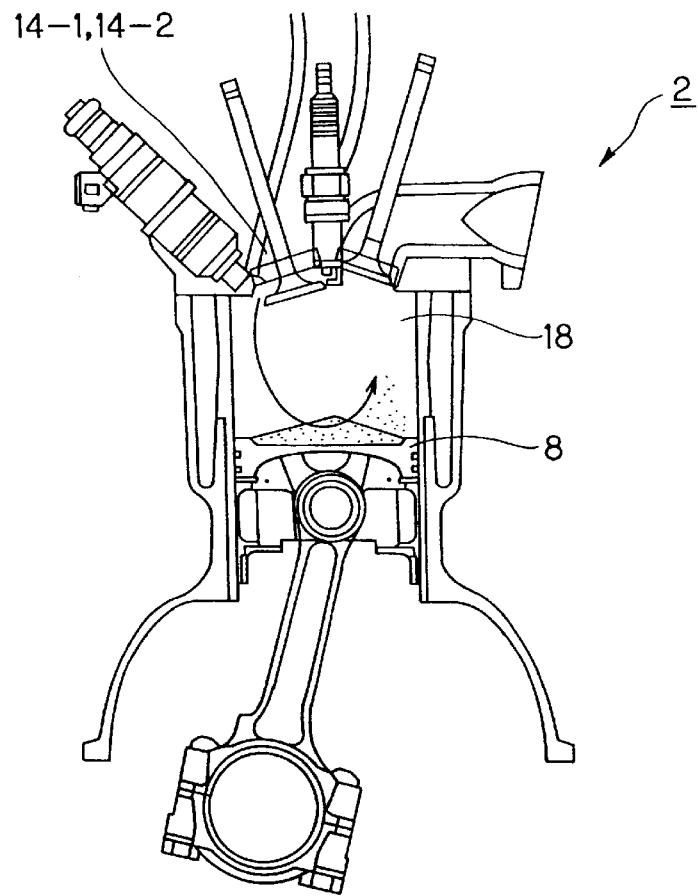
FIG. 30 is a schematic front view of the internal combustion engine at a later stage of the suction stroke.
Figure 31:
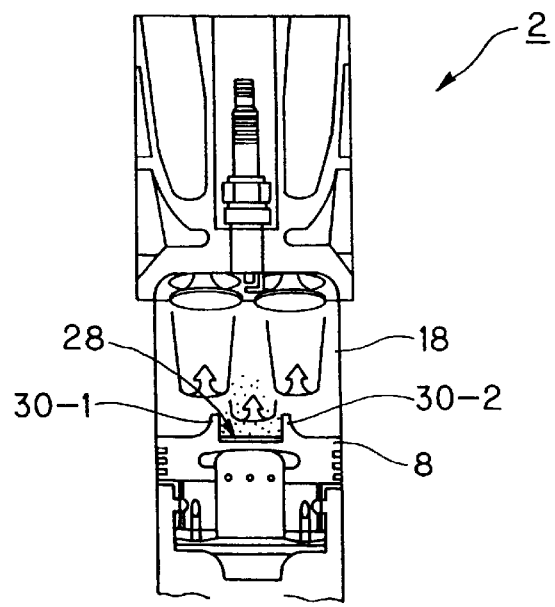
FIG. 31 is a schematic right side view thereof.
Figure 32:
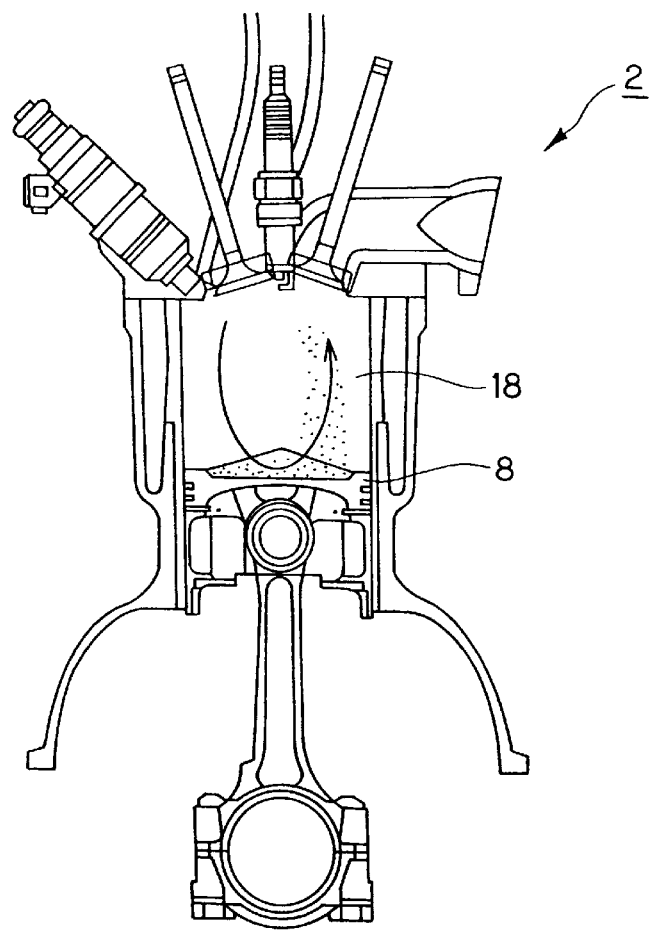
FIG. 32 is a schematic front view of the internal combustion engine at the end of the suction stroke.
Figure 33:
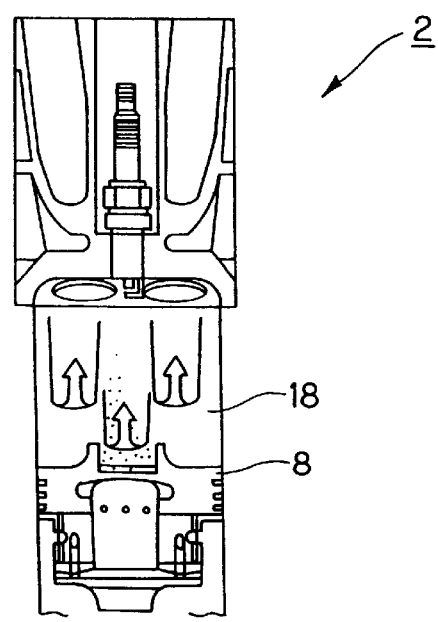
FIG. 33 is a schematic right side view thereof.
Figure 34:
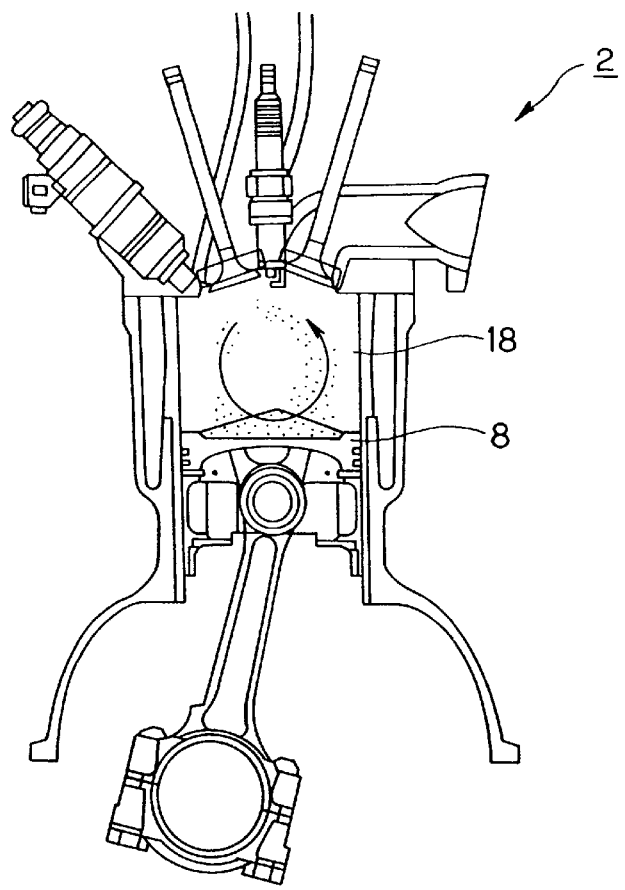
FIG. 34 is a schematic front view of the internal combustion engine at an initial stage of the compression stroke.
Figure 35:
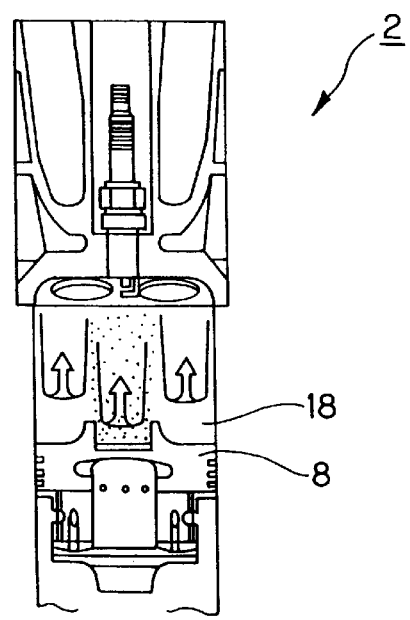
FIG. 35 is a schematic right side view thereof.
Figure 36:
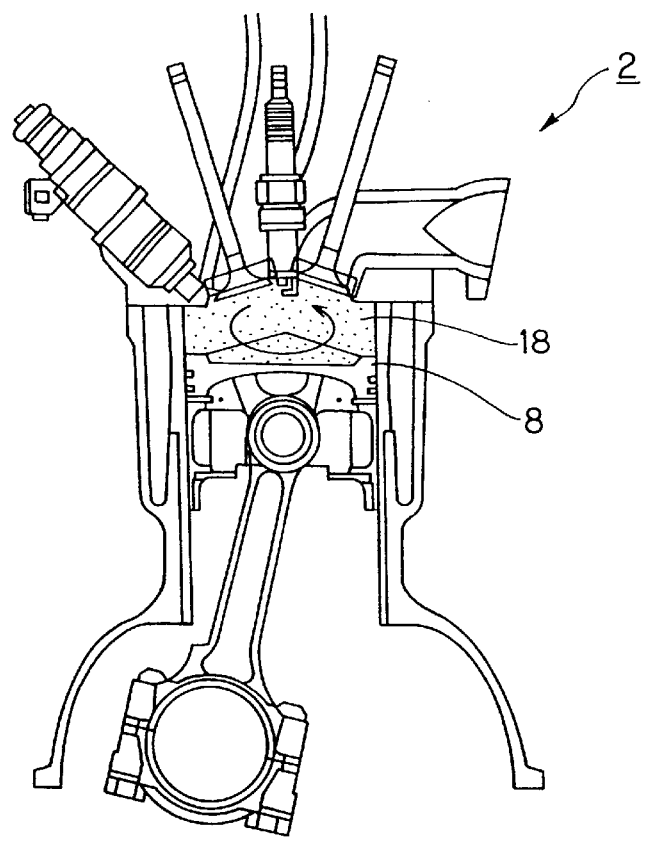
FIG. 36 is a schematic front view of the internal combustion engine at a later stage of the compression stroke.
Figure 37:
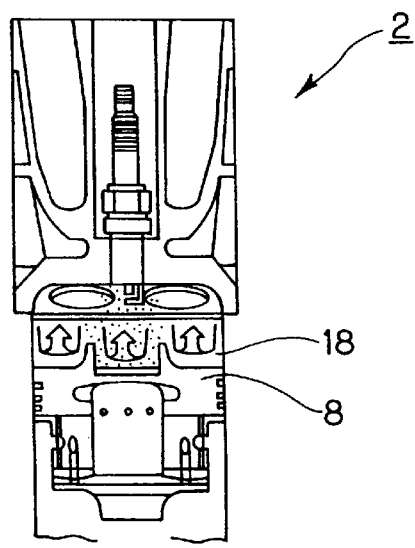
FIG. 37 is a schematic right side view thereof.
Figure 38:
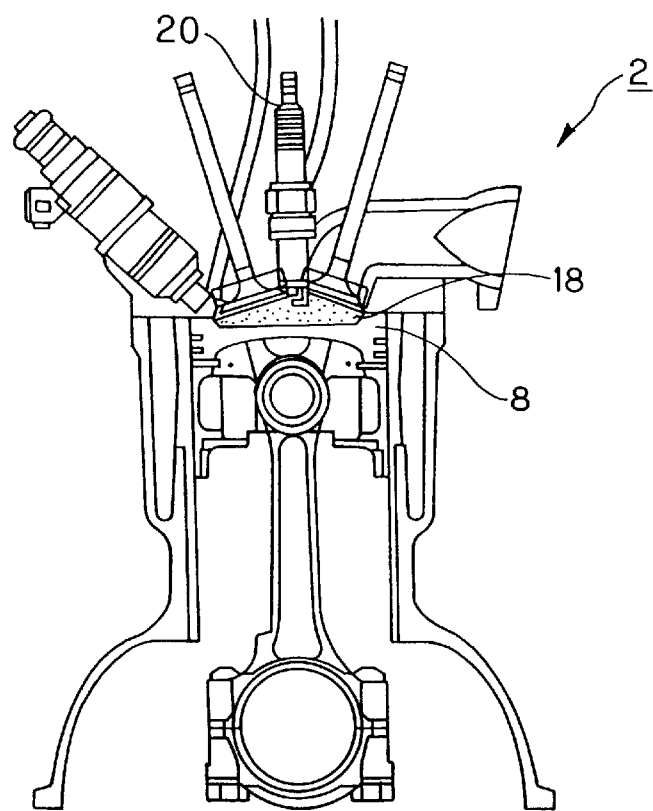
FIG. 38 is a schematic front view of the internal combustion engine at the end of the compression stroke and in a state of ignition.
Figure 39:
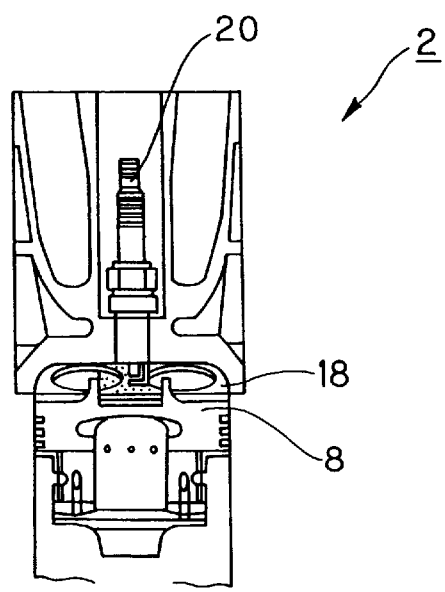
FIG. 39 is a schematic right side view thereof.

As shown in FIGS. 26 and 27, when the suction stroke is started at the top dead center position of the piston 8, fuel begins to be injected directly into the combustion chamber 18 from the injector 16. Then, as shown in FIGS. 28 and 29, the piston 8 goes down with rotation of the crank shaft 12 and intake air is fed into the combustion chamber 18 from the intake ports 14-1 and 14-2. As the piston 8 goes down, as shown in FIGS. 30 and 31, the interior of the combustion chamber 18 expands and reverse tumbling flows begin to be formed in the intake air which flows into the combustion chamber 18 from the intake ports 14-1 and 14-2. At this time, the intake air flowing into the combustion chamber 18 is divided into three by the recess 28 and flow dividing ribs 30-1, 30-2. When the piston 8 has moved down to its bottom dead center and the suction stroke is over, there are formed three divided reverse tumbling flows, i.e., stratified charge flows, within the combustion chamber 18, as shown in FIGS. 32 and 33. When the engine operation has shifted from the suction stroke to the compression stroke, the piston 8 begins to go up, as shown in FIGS. 34 and 35. Before arrival of the piston 8 at its top dead center, the interior of the combustion chamber 18 is contracted, as shown in FIGS. 36 and 37. Then, at the end of the compression stroke with the piston having arrived at its top dead center, ignition is conducted by the spark plug 20 disposed nearly centrally of the combustion chamber 18, as shown in FIGS. 38 and 39. Thereafter, a shift is made to the combustion stroke.

In this way, without obstructing reverse tumbling flows, a stratified charge can be realized as in the first embodiment by the recess 28 formed in the crown 8a of the piston 8. Since the shape of the piston 8 in the slap direction is symmetric, the piston is kept in good weight balance, so there is little influence on the piston behavior as is the case with the first embodiment. Consequently, it is possible to eliminate a mechanical loss such as oscillation and hence possible to improve the engine output.

Moreover, since the two flow dividing ribs 30-1 and 30-2 projecting toward the cylinder head 6 are formed on both sides of the recess 28 on the crown 8a of the piston 8, the stratification of reverse tumbling flows can be promoted by the flow dividing function of the ribs as in the first embodiment. Not only is this advantageous in practical use, but it is also possible to diminish the difference in height between the recess 28 and the crown 8a of the piston 8 and hence possible to constitute the piston 8 compactly.

Further, since the flow dividing ribs 30-1 and 30-2 are projected so as to match the shape of the combustion chamber defined by the underside of the cylinder head 6, namely, the concave shape of the cylinder head 6 underside, a stratified charge can be realized by the flow dividing ribs as in the first embodiment. Thus, lean burn can be stabilized. Further, since there is adopted the suction stroke injection method wherein the injection of fuel is conducted at an initial stage of the suction stroke, it is possible to ensure a sufficient time from the injection of fuel up to ignition, whereby an air-fuel mixture of good quality can be produced and the generation of smoke can be suppressed.

Figure 40:
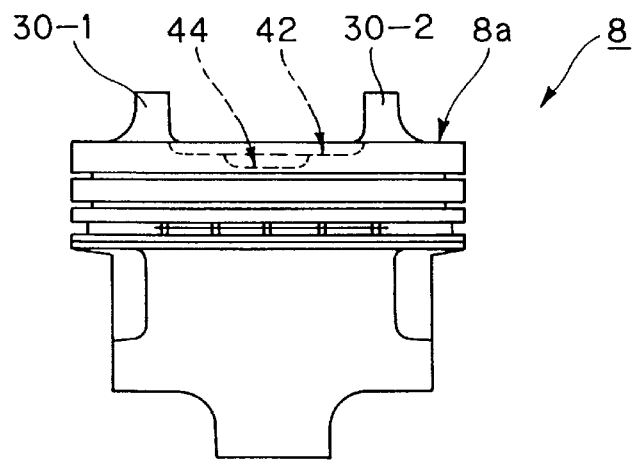
FIG. 40 is a front view of a piston according to a fifth embodiment of the present invention.
Figure 41:
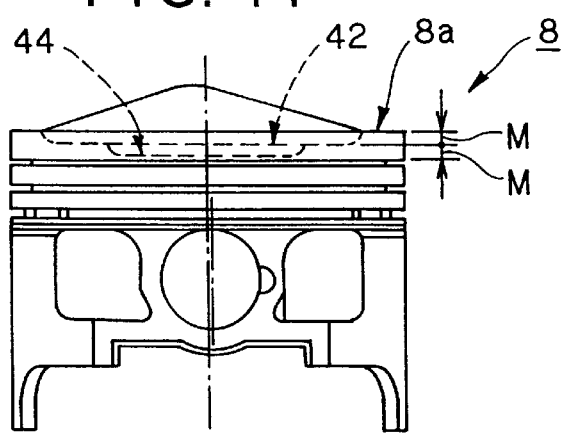
FIG. 41 is a right side view of the piston.
Figure 42:
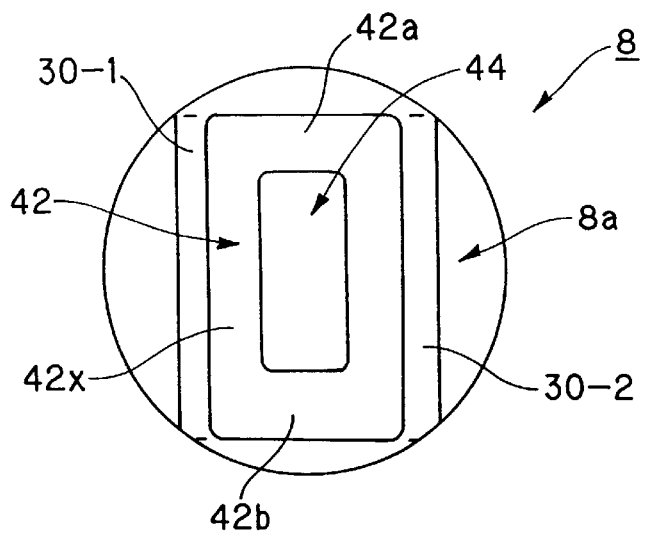
FIG. 42 is a plan view of the piston.

Referring now to FIGS. 40 to 42, there is illustrated a combustion chamber structure according to the fifth embodiment of the present invention. This fifth embodiment is characterized by a recess 42 formed in the crown 8a of the piston 8 so as to have a deepest recess portion 44 nearly centrally of a bottom 42x of the recess. More specifically, as shown in FIGS. 40 to 42, the deepest recess portion 44, which is generally rectangular and which has a predetermined depth M almost equal to the depth of the recess 42, is formed nearly centrally of the recess bottom 42x of the recess 42. In this case, the deepest recess 44 is formed so that its outer periphery is smoothly contiguous to the recess bottom 42x of the recess 42. The flow dividing ribs 30-1 and 30-2 used in the first embodiment are also used in this fifth embodiment.

According to this structure, the flow which has reached the intake-side end portion 42a of the recess 42 flows to the exhaust-side end portion 42b through the recess 42 and grows into a reverse tumbling flow. At this time, since the generally rectangular deepest recess portion 44 is formed in the bottom 42x of the recess 42, there arises a difference in speed among the flow in the recess 42, the flow in the deepest recess portion 44, and both side flows, depending on the depth, so that three charge layers are formed in the recess 42 and a total of five charge layers are formed.

Thus, as in the first embodiment, a stratified charge can be realized by the recess 42 formed in the crown 8a of the piston 8, without obstructing reverse tumbling flows. The symmetric shape of the piston 8 in the slap direction permits the piston to be kept in good weight balance, so that, as in the first embodiment, there is little influence on the piston behavior. Thus, it is possible to eliminate mechanical loss, such as oscillation, and to improve the engine output.

Moreover, since two flow dividing ribs 30-1 and 30-2 projecting toward the cylinder head 6 are formed on both sides of the recess 42 on the crown 8a of the piston 8, the stratification of reverse tumbling flows can be promoted by the flow dividing function as is the case with the first embodiment. Thus, the difference in height between the recess 42 and the crown 8a of the piston 8 can be diminished and the piston 8 can be compactly formed.

Since the flow dividing ribs 30-1 and 30-2 are projected so as to match the shape of the combustion chamber defined by the underside of the cylinder head 6, namely, the concave shape of the cylinder head 6 underside, a stratified charge can be realized by the flow dividing ribs 30-1 and 30-2 as is the case with the first embodiment. Consequently, lean burn can be stabilized. Further, since the generally rectangular deepest recess portion 44 is formed in the bottom 42x of the recess 42, there arises a difference in speed among the flow in the recess 42, the flow in the deepest recess portion 44, and both side flows. Consequently, three charge layers can be formed in the recess 42 and a total of five charge layers are formed, whereby lean burn can be made more stable.

Figure 43:
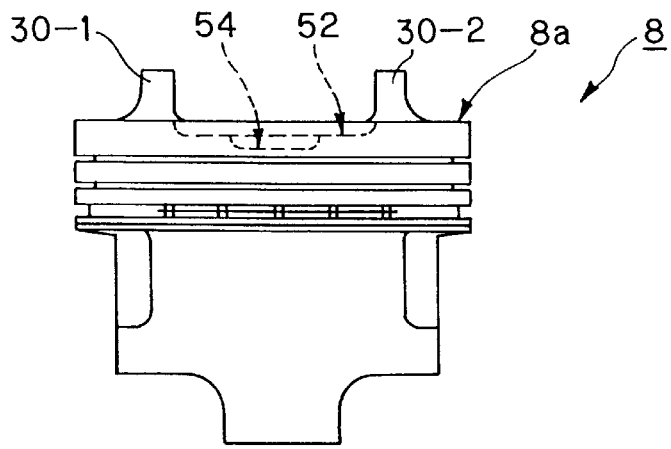
FIG. 43 is a front view of a piston according to a sixth embodiment of the present invention.
Figure 44:
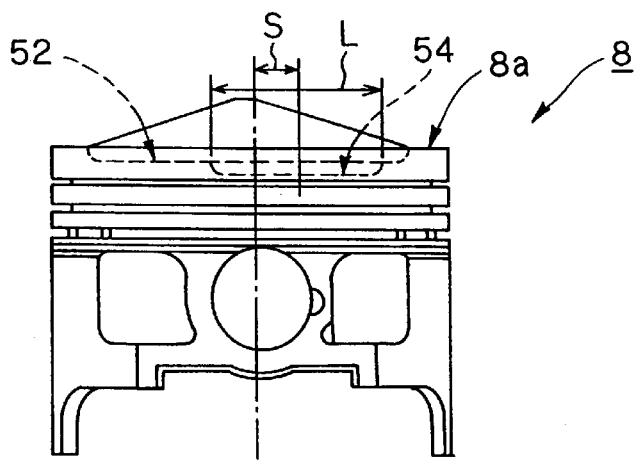
FIG. 44 is a right side view of the piston.
Figure 45:
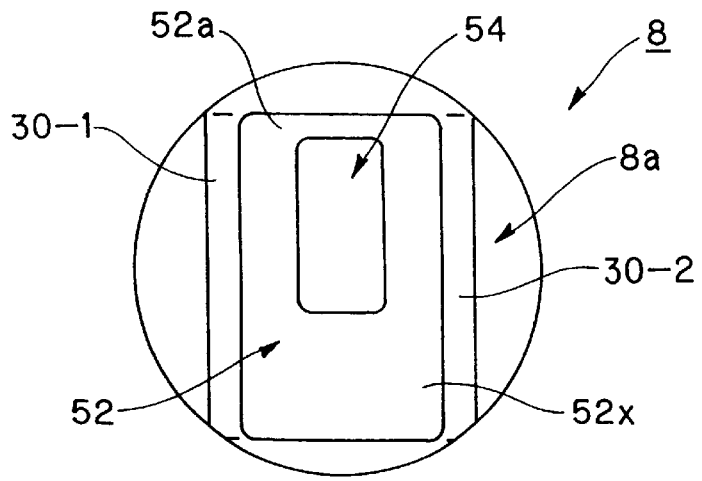
FIG. 45 is a plan view of the piston.

Referring now to FIGS. 43 to 45, there is illustrated a combustion chamber structure according to the sixth embodiment of the present invention. This sixth embodiment is characterized by a recess 52 formed in the crown 8a of the piston 8 so as to have a deepest recess portion 54 on an intake-side end portion 52a of a bottom 52x. More specifically, as shown in FIGS. 43 to 45, the deepest recess portion 54 is formed on the intake-side end portion 52a of the bottom 52x of the recess 52. The deepest recess portion 54 is generally rectangular and has a predetermined depth almost equal to the depth of the recess 52.

As shown in FIG. 44, the deepest recess portion 54 has a length L which is approximately a half or so of the length of the recess 52. A middle position of the length L is offset toward the intake-side end portion 52a by a predetermined length S from nearly the center of the piston 8. The bottom 52x of the recess 52 and the outer periphery of the deepest recess portion 54 are made contiguous to each other smoothly. The flow dividing ribs 30-1 and 30-2 used in the first and fifth embodiments are also used in this embodiment.

According to this structure, without obstructing reverse tumbling flows, a stratified charge can be realized by the recess 52 formed in the crown 8a of the piston 8 as in the first and fifth embodiments. The symmetric shape of the piston 8 in the slap direction permits the piston to be kept in good weight balance, so that, as in the first and fifth embodiments, there is little influence on the piston behavior. Thus, it is possible to eliminate mechanical loss such as oscillation, and improve the engine output.

Further, since the two flow dividing ribs 30-1 and 30-2 projecting toward the cylinder head 6 are formed on both sides of the recess 52 on the crown 8*a* of the piston 8, the stratification of reverse tumbling flows can be promoted by the flow dividing function as is the case with the first and fifth embodiments. Not only is this advantageous in practical use, but it also enables diminishing of the difference in height between the recess 52 and the crown 8*a* of the piston 8 and thus enables making of the piston 8 in a compact form. Further, since the flow dividing ribs 30-1 and 30-2 are projected to match the shape of the combustion chamber defined by the underside of the cylinder head 6, namely, the concave shape of the cylinder head 6 underside, a stratified charge can be realized by the flow dividing ribs 30-1 and 30-2 as is the case with the first and fifth embodiments, whereby lean burn can be made stable.

Since the generally rectangular deepest recess portion 54 is formed on the intake-side end portion 52*a* side of the bottom 52*x* of the recess 52, there arises a difference in speed among the flows in the recess 52, the flow in the deepest recess portion 54, and both side flows, whereby three charge layers can be formed in the recess 52 and a total of five charge layers are formed. Thus, lean burn can be made more stable as in the fifth embodiment.

Figure 46:
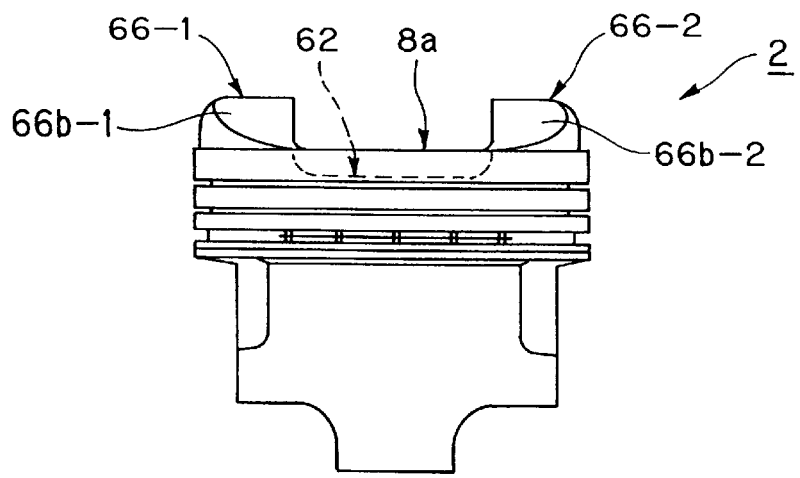
FIG. 46 is a front view of a piston according to a seventh embodiment of the present invention.
Figure 47:
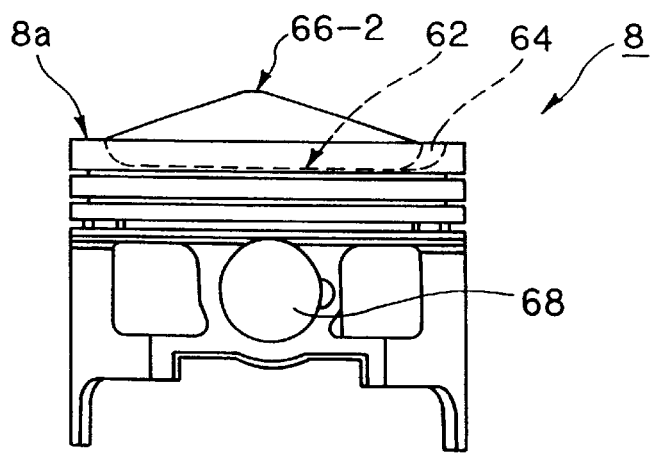
FIG. 47 is a right side view of the piston.
Figure 48:
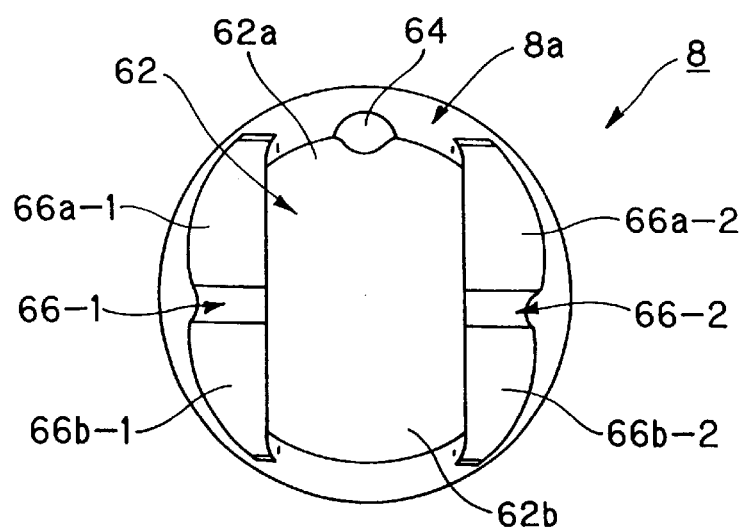
FIG. 48 is a plan view of the piston.

Referring now to FIGS. 46 to 48, there is illustrated a combustion chamber structure according to the seventh embodiment of the present invention. This seventh embodiment is characterized in that an intake-side end portion 62*a* and an exhaust-side end portion 62*b* of a recess 62 are formed in an arcuate shape and that a relief recess 64 is formed in the intake-side end portion 62*a* of the recess 62 in a corresponding relation to an injector (not shown). More specifically, as shown in FIG. 48, the intake-side and exhaust-side end portions 62*a,* 62*b* of the recess 62 are formed in an arcuate shape conforming to the outer peripheral shape of the piston 8. The relief recess 64 is formed in the intake-side end portion 62*a* of the recess 62 by cutting out the crown 8*a* of the piston 8 in the shape of a curved surface corresponding to the injector (not shown), as shown in FIG. 48.

Two flow dividing ridge portions 66-1 and 66-2 are formed on both sides of the recess 62 on the crown 8*a* of the piston 8. The ridge portions 66-1 and 66-2 extend substantially throughout both side positions, as shown in FIG. 48. As shown in FIGS. 46 to 48, the flow dividing ridge portions 66-1 and 66-2 are formed so as to be raised in a generally triangular shape to match the shape of the combustion chamber defined by the underside of the cylinder head (not shown), namely, the concave shape of the cylinder head underside, so as to be highest at the respective central positions. Further, first faces 66*a*-1 and 66*a*-2 for squish are formed which extend from the central positions toward the intake-side end portion 62*a* of the recess 62. Likewise, second faces 66*b*-1 and 66*b*-2 for squish are formed on the exhaust-side end portion 62*b* side of the recess 62. Thus a compact combustion chamber, which is small in an axial width of a pin 68, is formed by the flow dividing ridge portions 66-1 and 66-2.

According to this structure, with the recess 62 formed in the crown 8*a* of the piston 8, a stratified charge can be realized without obstructing reverse tumbling flows, as in the first to third embodiments. The weight balance of the piston 8 is kept in good condition because of the symmetric shape thereof in the slap direction, so that, as is the case with the first to third embodiments, there is little influence on the piston behavior and it is possible to eliminate a mechanical loss such as oscillation, and improve the engine output.

Moreover, since the two flow dividing ridge portions 66-1 and 66-2 raised toward the cylinder head 6 are formed on both sides of the recess 62 on the crown 8*a* of the piston 8, the stratification of reverse tumbling flows can be promoted by the flow dividing function. Not only is this advantageous in practical use, but it also makes possible diminishing the difference in height between the recess 62 and the crown 8*a* of the piston 8 and hence makes possible constituting the piston 8 in a compact form. Further, since the recess 62 is formed in an arcuate shape matching the outer peripheral shape of the piston 8, the flow of intake air into and out of the recess 62 becomes smooth, thus contributing to the formation of stable reverse tumbling flows. Since the flow dividing ridge portions 66-1 and 66-2 are formed substantially throughout the whole side zones on both sides of the recess 62 on the crown 8*a* of the piston 8, not only the piston 8 can be made compact, but also the center of gravity thereof is concentrated on the central part of the combustion chamber by the ridge portions 66-1 and 66-2, so that a good weight balance of the piston can be attained.

Further, at a later stage of the compression stroke, squish flows are formed by the first and second squishing faces 66*a*-1 and 66*a*-2, 66*b*-1, 66*b*-2 of the flow dividing ridge portions 66-1 and 66-2 and also by the concave shape of the cylinder head underside, whereby the state of mixing between fuel and fresh air can be improved.

Figure 49:
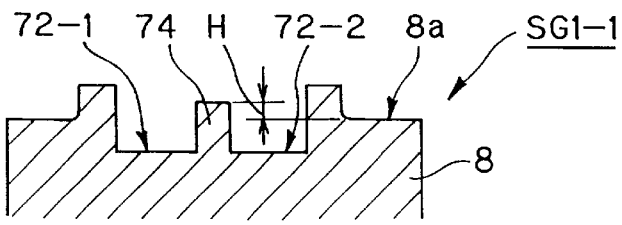
FIG. 49 is a schematic enlarged end view of a piston crown according to a modification in the present invention.

The present invention is not limited to the above first to seventh embodiments, but various applications and modifications may be made. For example, although in the first embodiment of the present invention there is formed a single recess 28 in the crown 8*a* of the piston 8, there may be adopted a construction (SG1-1) wherein at least two recesses extending in the slap direction are formed in the crown 8*a* of the piston 8. More specifically, as shown in FIG. 49, two parallel recesses 72-1 and 72-2 are formed in the crown 8*a* of the piston 8 in such a manner that a convex portion 74 is present between both recesses 72-1 and 72-2 to partition the recesses 72-1 and 72-2 from each other (SG1-1). The convex portion 74 is formed so as to be higher by H than the crown 8*a* of the piston 8, provided the height of the convex portion 74 may be made equal to or lower than the crown 8*a* of the piston 8.

According to this structure, a stratified charge can be realized vertically as two divided layers, without obstructing reverse tumbling flows, by the first and second recesses 72-1, 72-2 formed in the crown 8*a* of the piston 8. Further, a flow uniforming effect can be attained. Moreover, since the piston 8 is kept in good weight balance because of its symmetric shape in the slap direction, with little influence on the piston behavior, it is possible to eliminate a mechanical loss such as oscillation and improve the engine output.

Figure 50:
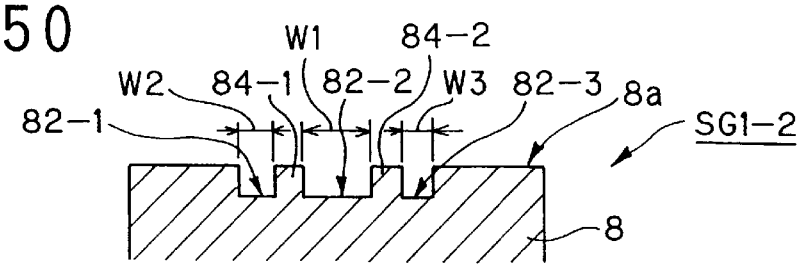
FIG. 50 is a schematic enlarged end view of a piston crown according to another modification in the present invention.

There may be adopted such a construction (SG1-2) as shown in FIG. 50 wherein three first to third parallel recesses 82-1, 82-2 and 82-3 are formed in the crown 8*a* of the piston 8 so that two first and second convex portions 84-1, 84-2 are formed among those recesses 82-1, 82-2 and 82-3 to partition the recesses 82-1, 82-2 and 82-3 from one another. The first to third recesses 82-1, 82-2 and 82-3 are formed so as to be almost equal in depth. In this case, for example the width W1 of the second recess 82-2 positioned centrally is larger than the widths W2 and W3 of the first and third recesses 82-1, 82-3. The first to third recesses 82-1, 82-2 and 82-3 may be formed so that the second recess 82-2 is different in depth than the first and third recesses 82-1, 82-3. Further, the widths W2, W1 and W3 of the first to third recesses 82-1, 82-2 and 82-3 may be set equal to one another.

According to this structure, without obstructing reverse tumbling flows, a stratified charge can be realized vertically as three divided layers caused by the first to third recesses 82-1, 82-2 and 82-3 formed in the crown 8a of the piston 8. Further, a flow uniforming effect can be attained. Moreover, since the shape of the piston 8 in the slap direction is symmetric, the piston is kept in good weight balance, so that the piston behavior is little influenced. Thus, mechanical loss, such as oscillation, can be eliminated and engine output improved.

Figure 51:
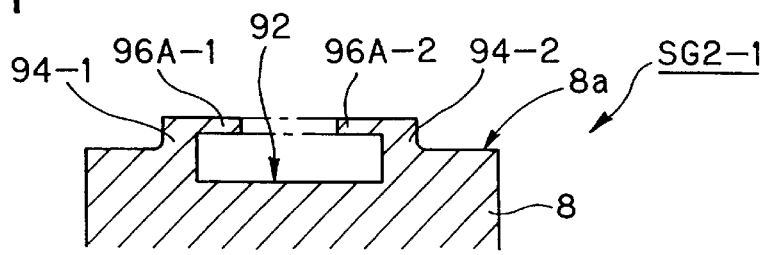
FIG. 51 is a schematic enlarged end view of a piston crown according to a further modification in the present invention.
Figure 52:
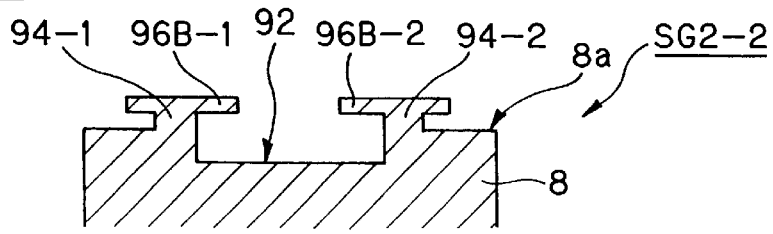
FIG. 52 is a schematic enlarged end view of a piston crown according to a still further modification in the present invention.

In the first embodiment, the flow dividing ribs 30-1 and 30-2 are formed on the crown 8a of the piston 8 and merely project toward the cylinder head 6 so as to match the shape of the combustion chamber defined by the underside of the cylinder head 6, namely, the concave shape of the cylinder head 6 underside. There may be adopted such a construction (SG2-1, SG2-2) as shown in FIG. 51 or FIG. 52 wherein flow dividing ribs 94-1 and 94-2 projecting toward the cylinder head are formed in an extending direction of a recess 92 and on both sides of the same recess 92 on the crown 8a of the piston 8 so as to have enclosing portions which enclose at least a part of the space located above the recess 92. More specifically, as shown in FIG. 51, enclosing portions 96A-1 and 96A-2 are formed on the upper ends of the flow dividing ribs 94-1 and 94-2, respectively, so as to project to the recess 92 side and enclose at least a part of the space located above the recess 92. According to this construction, since a part of the space located above the recess 92 is enclosed with the enclosing portions 96A-1 and 96A-2, a reliable flow can be created within the recess 92 and an independent stratified charge can be realized, without obstructing reverse tumbling flows. Thus, a flow uniforming effect can be attained. Moreover, since the shape of the piston 8 in the slap direction is symmetric, the weight balance of the piston is improved, so that the piston behavior is little influenced and it is possible to eliminate a mechanical loss such as oscillation and to improve the engine output.

In FIG. 52, enclosing portions 96B-1 and 96B-2 having a T-shaped section are formed on the upper ends of the flow dividing ribs 94-1 and 94-2, respectively, so as to project in transverse directions of the recess 92, that is, to both the recess 92 side and the side spaced away from the recess 92, and enclose at least a part of the space located above the recess 92. According to this construction, not only the space located above the recess 92 is partially enclosed by the enclosing portions 96B-1 and 96B-2, but also upper portions on both sides of the recess 92 in the extending direction of the recess 92 on the crown 8a of the piston 8 are partially enclosed, whereby, without obstructing reverse tumbling flows, reliable flows can be formed within the recess 92 and on both sides of the recess 92, thus permitting an independent stratified charge to be realized. Thus, a flow uniforming effect can also be attained. Moreover, the symmetric shape of the piston 8 in the slap direction permits the piston to be kept in good weight balance, so that there is little influence on the piston behavior and mechanical loss, such as oscillation, can be eliminated.

In connection with the construction (SG2-1), the flow dividing ribs 94-1 and 94-2 projecting toward the cylinder head are formed on both sides of the recess 92 on the crown 8a of the piston 8 in the extending direction of the recess 92 so as to have enclosing portions to enclose at least a part of the space located above the recess 92. There may be adopted a construction wherein the upper end portions of the flow dividing ribs 94-1 and 94-2 are closed (see an alternate long and short dash line in FIG. 51) to cover substantially the whole area above the recess, thereby forming a tunnel-like recess and allowing two outer and inner flows to be created by the recess and the upper enclosing portion. According to this construction, a double flow characteristic is obtained in addition to the characteristic of a stratified charge.

Figure 53:
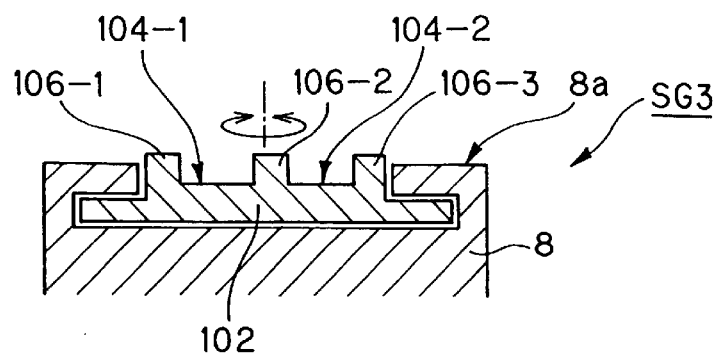
FIG. 53 is a schematic enlarged end view of a piston crown according to a still further modification in the present invention.
Figure 54:
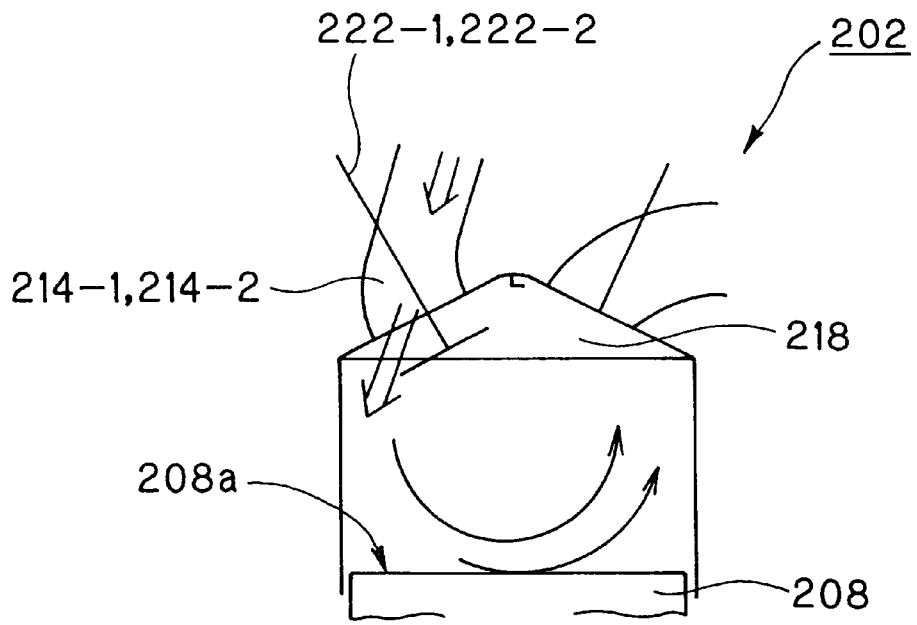
FIG. 54 is a schematic front view of a combustion chamber in a conventional internal combustion engine.
Figure 55:
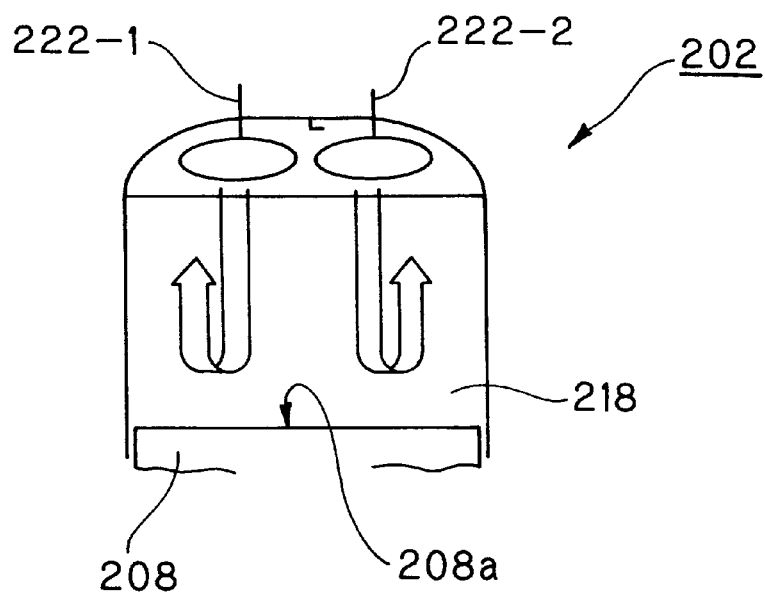
FIG. 55 is a schematic right side view thereof.

Although in the first embodiment of the present invention the recess 28 and the flow dividing ribs 30-1 and 30-2 are merely formed in the crown 8a of the piston 8, there may be adopted such a construction (SG3), as shown in FIG. 53, wherein a rotary member 102 is held rotatably on the crown 8a of the piston 8 and, say, two recesses 104-1 and 104-2 and flow dividing ribs 106-1, 106-2 and 106-3 are formed on the upper surface of the rotary member 102. According to this construction, during the reciprocating motion of the piston 8, the rotary member 102 rotates and imparts turbulence to the reverse tumbling flows in the combustion chamber, whereby the air-fuel mixture present in the same chamber is agitated, allowing unburnt portions to burn. Thus, it is possible to improve the combustibility and purify the exhaust gas.

What is claimed is:

1. A combustion chamber structure in an internal combustion engine wherein a spark plug is disposed at a nearly central position of a combustion chamber formed between an underside of a cylinder head and a crown of a piston, intake valves are disposed on one side of said cylinder head and exhaust valves are disposed on the other side of said cylinder head, and the piston is joined to a connecting rod by a coupling hinge pin so that the piston has a slap direction which extends perpendicular to the coupling pin, the intake and exhaust valves being disposed on opposite sides of the coupling pin so as to be spaced along the slap direction, the improvement comprising a recess formed in said piston crown and elongate in the slap direction for connecting said intake and exhaust valves, the recess having a generally rectangular bottom, the recess being formed at ends thereof in the slap direction by end walls which project upwardly for connection to said piston crown with said end walls being spaced inwardly from the periphery of the piston crown to form squish flows at both ends of the recess between the recess end walls and the periphery of the piston crown.

2. The combustion chamber structure in an internal combustion engine according to claim 1, wherein said piston is provided with flow dividing ribs on said crown thereof and on opposing sides of the recess extending in the slap direction, said flow dividing ribs projecting toward said cylinder head.

3. The combustion chamber structure in an internal combustion engine according to claim 2, wherein said flow dividing ribs are formed in conformity with the shape of the combustion chamber defined by the underside of said cylinder head.

4. The combustion chamber structure in an internal combustion engine according to claim 1, wherein part of the bottom of the recess includes a deeper recess portion.

5. The combustion chamber structure in an internal combustion engine according to claim 1, wherein said internal combustion engine includes intake ports formed in said cylinder head to create reverse tumbling flows, and an injector is disposed on said intake port side.

6. The combustion chamber structure in an internal combustion engine according to claim 1, wherein said piston includes a second recess formed in said crown, said second recess being elongate in the slap direction.

7. The combustion chamber structure in an internal combustion engine according to claim 1, wherein said piston includes flow dividing ribs formed on said crown thereof and on opposing sides of the recess, the flow dividing ribs extending in the slap direction, said flow dividing ribs projecting toward said cylinder head and being formed so as to have respective enclosing portions which enclose at least a part of the space located above the recess.

8. The combustion chamber structure according to claim 1, wherein said end walls of said piston crown co-operate with a flat portion of said cylinder head to form said squish flows.

9. The combustion chamber structure according to claim 1, wherein said piston crown is symmetric about a first central axis in the slap direction and symmetric about a second central axis in a direction transverse to the slap direction.

10. The combustion chamber structure according to claim 1, wherein said recess is free from outwardly projecting grooves.

11. A combustion chamber structure in an internal combustion engine comprising:
 a cylinder head having intake valves disposed on one side thereof and exhaust valves disposed on the other side of said cylinder head;
 a piston having a piston crown;
 a combustion chamber defined by an underside of said cylinder head and said piston crown of said piston;
 wherein said piston crown includes: a recess formed in said piston crown and connecting said intake and exhaust valves, the recess being formed so as to have vertical end wall portions for forming squish flows at both ends of the recess, and flow dividing ribs formed on both sides.

12. The combustion chamber structure of claim 11, wherein the recess extends in a slap direction to connect said intake and exhaust valves.

13. The combustion chamber structure of claim 8, wherein intake ports are formed in said cylinder head to create reverse tumbling flows, and an injector is disposed on an intake port side of said cylinder head.

14. The combustion chamber structure of claim 13, wherein said flow dividing ribs divide a flow from said intake ports to create three of the reverse tumbling flows to form three vertical charge layers within the combustion chamber.

15. The combustion chamber structure according to claim 11, wherein said piston crown is symmetric about a first central axis in a slap direction and symmetric about a second central axis in a direction transverse to the slap direction.

16. The combustion chamber structure in an internal combustion engine according to claim 11, wherein the recess is formed as an elongate recess with end wall portions for the formation of squish flows at both ends of the recess between the end wall portions and the periphery of the piston crown.

17. The combustion chamber structure of claim 11, wherein said recess is free from outwardly projecting grooves.

18. A combustion chamber structure in an internal combustion engine comprising:
 a cylinder head having intake valves disposed on one side thereof and exhaust valves disposed on the other side of said cylinder head;
 a piston having a piston crown, said piston crown including an elongate recess formed in said piston crown and connecting said intake and exhaust valves, said piston crown being symmetric about a first central axis in a slap direction and about a second central axis transverse to the slap direction; and
 a combustion chamber defined by an underside of said cylinder head and said piston crown of said piston,
 wherein said internal combustion engine has intake ports formed in said cylinder head to create reverse tumbling flows.

19. The combustion chamber structure in an internal combustion engine according to claim 18, wherein said elongate recess extends in the slap direction and having a substantially rectangular bottom formed in said piston crown.

* * * * *